United States Patent [19]

Tsutsui et al.

[11] Patent Number: 5,731,767
[45] Date of Patent: Mar. 24, 1998

[54] INFORMATION ENCODING METHOD AND APPARATUS, INFORMATION DECODING METHOD AND APPARATUS, INFORMATION RECORDING MEDIUM, AND INFORMATION TRANSMISSION METHOD

[75] Inventors: Kyoya Tsutsui, Kanagawa; Robert Heddle, Tokyo, both of Japan

[73] Assignee: Sony Corporation, Tokyo, Japan

[21] Appl. No.: 532,721

[22] PCT Filed: Feb. 3, 1994

[86] PCT No.: PCT/JP95/00146

§ 371 Date: Sep. 27, 1995

§ 102(e) Date: Sep. 27, 1995

[87] PCT Pub. No.: WO95/21489

PCT Pub. Date: Aug. 10, 1995

[30] Foreign Application Priority Data

Feb. 4, 1994 [JP] Japan .................................. 6-013017
Feb. 4, 1994 [JP] Japan .................................. 6-032828

[51] Int. Cl.$^6$ .......................... H03M 7/30; H04B 14/00; G11B 20/10
[52] U.S. Cl. .................................. 341/50; 395/2.34
[58] Field of Search ....................... 341/50, 51; 395/2.31, 395/2.34

[56] References Cited

U.S. PATENT DOCUMENTS

| 3,515,792 | 6/1970 | Deutsch .................... 84/1.03 |
| 3,929,053 | 12/1975 | Deutsch .................... 84/1.24 |
| 4,492,930 | 1/1985 | Knowles et al. ............ 330/284 |
| 4,641,361 | 2/1987 | Rosback .................... 381/103 |
| 4,853,963 | 8/1989 | Bloy et al. ................ 381/31 |
| 4,896,362 | 1/1990 | Veldhuis et al. ........... 381/30 |
| 5,105,463 | 4/1992 | Veldhuis et al. ........... 381/30 |
| 5,109,417 | 4/1992 | Fielder et al. ............. 381/36 |

(List continued on next page.)

FOREIGN PATENT DOCUMENTS

| 61-201526 | 9/1986 | Japan ................. H04B 14/00 |
| 63-7023 | 1/1988 | Japan ................. H03M 1/00 |
| WO 95/21489 | 8/1995 | WIPO ................. H03M 7/30 |

OTHER PUBLICATIONS

R. Crochiere et al., "Digital Coding of Speech in Sub-Bands," The Bell System Technical Journal, vol. 55, No. 8, Oct. 1976, pp. 1069–1085.

J. Rothweiler, "Polyphase Quadrature Filters—A New Subband Coding Technique," IEEE Int'l Conf on Acoustics, Speech & Signal Processing, vol. 3 of 3, Apr. 14–16, pp. 1280–1283.

J. Princen et al., "Subband/Transform Coding Using Filter Bank Designs Based On Time Domain Aliasing Cancellation," IEEE Int'l Conf On Acoustics, Speech & Signal Processing, vol. 4, Apr. 6–9, 1987, pp. 2161–2164.

M. Krasner, "The Critical Band Coder—Digital Encoding of Speech Signals Based on the Perceptual Requirements of the Auditory System," IEEE, vol. 1–3, Apr. 1980, pp. 327–331.

R. Zelinski et al., "Adaptive Transform Coding of Speech Signals," IEEE Transactions on Acoustics, Speech & Signal Processing, vol. ASSP–25, No. 4, Aug. 1977, pp. 299–309.

Primary Examiner—Jeffrey A. Gaffin
Assistant Examiner—Peguy JeanPierre
Attorney, Agent, or Firm—Limbach & Limbach L.L.P.

[57] ABSTRACT

The present invention includes an encoding and decoding apparatus and method where there is used a transform processing to allow a waveform element of a corresponding block to interfere with waveform elements of blocks adjoining in both directions at the time of inverse transform processing as in the case of, e.g., MDCT, to compose a waveform signal, amplifying processing in encoding and corresponding correction processing in decoding can be carried out without inconsistency between blocks. Thus, occurrence of pre-echo can be prevented by simple configuration by using spectrum transform processing of high encoding efficiency.

73 Claims, 25 Drawing Sheets

U.S. PATENT DOCUMENTS

| | | | |
|---|---|---|---|
| 5,117,228 | 5/1992 | Fuchigami et al. | 341/200 |
| 5,128,963 | 7/1992 | Akagiri | 375/25 |
| 5,185,800 | 2/1993 | Mahieux | 381/29 |
| 5,264,846 | 11/1993 | Oikawa | 341/76 |
| 5,268,685 | 12/1993 | Fujiwara | 341/76 |
| 5,299,240 | 3/1994 | Iwahashi et al. | 375/122 |
| 5,357,594 | 10/1994 | Fielder | 395/2.2 |
| 5,381,143 | 1/1995 | Shimoyoshi et al. | 341/51 |
| 5,394,473 | 2/1995 | Davidson | 381/36 |
| 5,454,011 | 9/1995 | Shimoyoshi | 375/240 |
| 5,461,378 | 10/1995 | Shimoyoshi et al. | 341/51 |
| 5,502,789 | 3/1996 | Akagiri | 395/2.13 |
| 5,541,600 | 7/1996 | Blumenkrantz et al. | 341/139 |
| 5,581,654 | 12/1996 | Tsutsui | 395/2.39 |

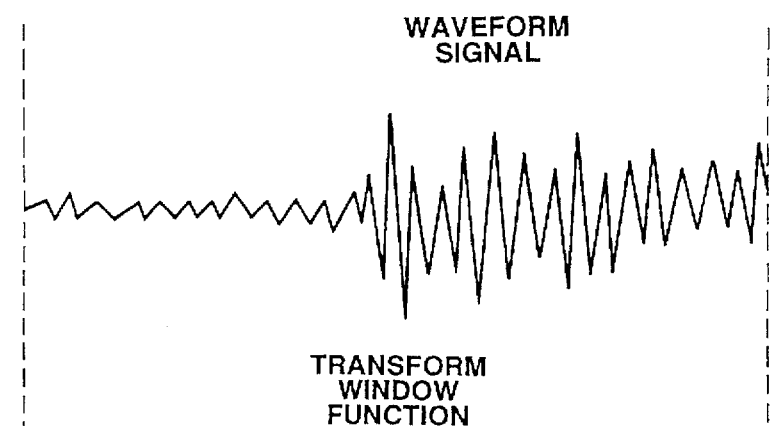
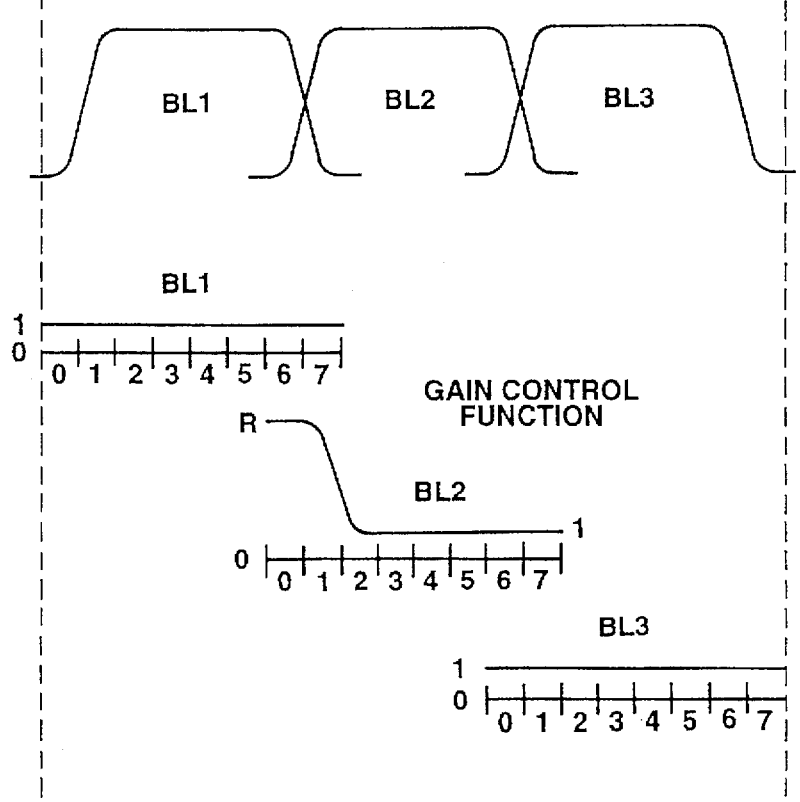

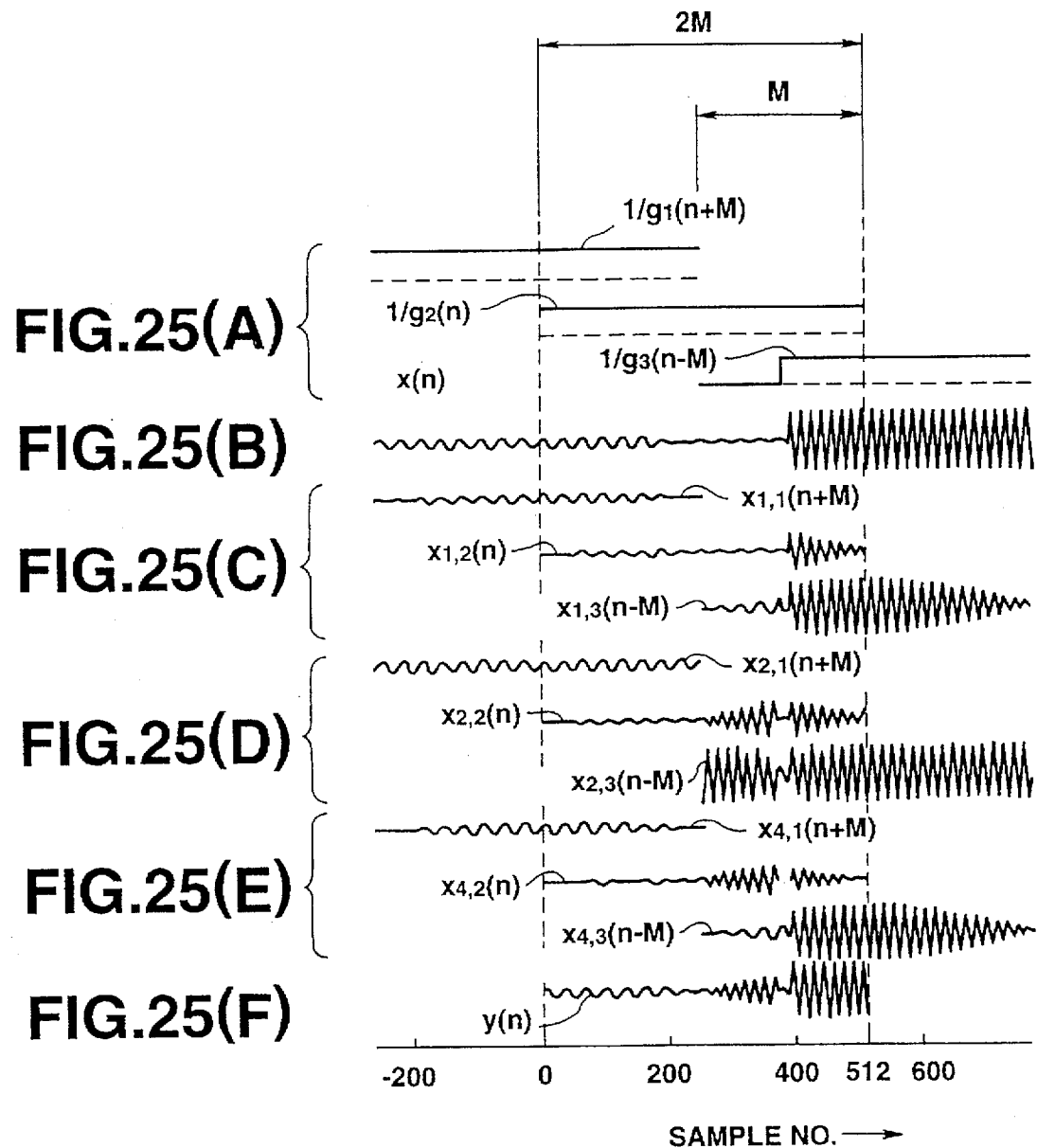

INFORMATION ENCODING METHOD AND APPARATUS, INFORMATION DECODING METHOD AND APPARATUS, INFORMATION RECORDING MEDIUM, AND INFORMATION TRANSMISSION METHOD

TECHNICAL FIELD

This invention relates to an information encoding method and an information encoding apparatus, an information decoding method and an information decoding apparatus, an information recording medium, and an information transmission method suitable when used in such a system to carry out encoding of input digital data by so called efficient encoding to allow encoded data to undergo transmission, recording, reproducing and decoding thus to obtain reproduced signals.

BACKGROUND ART

Hitherto, various efficient encoding techniques for audio signals or speech signals, etc. are known. For example, there can be enumerated a Sub Band Coding (SBC), which is the non-blocking frequency division system, for dividing an audio signal, etc. on the time base into signal components in a plurality of frequency bands without carrying out blocking to encode them, a blocking frequency band division system so called a transform encoding for transforming (spectrum-transforming) a signal on the time base into a signal on the frequency base thereafter to divide it into signal components in a plurality of frequency bands to encode them every respective bands. Moreover, an efficient encoding technique in which the Sub Band Coding (SBC) and the transform encoding described above are combined is also proposed. In this case, for example, band division is carried out by the Sub Band Coding thereafter to spectrum-transform signals every respective bands into signals on the frequency base to encode these spectrum-transformed signals every respective bands.

Here, as a band division filter used in the above-described Sub Band Coding, there is, e.g., QMF filter. This QMF filter is described in Digital coding of speech in subbands, R. E. Crochiere, Bell Syst. Tech. J. Vol. 55, No. 8 1976.

Moreover, in the literature "Polyphase Quadrature filters-A new subband coding technique, Joseph H. Rothweiler, ICASSP 83 BOSTON, filter division technique of equal bandwidth is described.

Further, as the above-described spectrum transform processing, there is, e.g., such a spectrum transform processing to carry out blocking of an input audio signal every predetermined unit time (frame) to carry out, every respective blocks, Discrete Fourier Transform (DFT), Discrete Cosine Transform (DCT), or Modified DCT (MDCT), etc. to thereby transform signals on the time base into signals on the frequency base. The above-mentioned MDCT is described in the literature "Subband/Transform Coding Using Filter Bank Designs Based on Time Domain Aliasing Cancellation, J. P. Princen, A. B. Bradley, Univ. of Surrey, Royal Melbourne Inst. of Tech. ICASSP 1987.

By quantizing signals divided every bands by filter or spectrum transform processing in this way, it is possible to control bands where quantizing noises are produced. Thus, it is possible to carry out more efficient encoding from a viewpoint of the hearing sense by making use of the property such as so called masking effect, etc. In addition, if there is employed an approach to carry out, prior to implementation of quantization, normalization, every respective bands, e.g., by the maximum value of the absolute values of signal components in corresponding bands, further more efficient encoding can be carried out.

Here, there are many instances where as frequency division width in the case where respective frequency components subjected to frequency division are quantized, e.g., bandwidths in which the hearing sense characteristic of the human being is taken into consideration are used. Namely, there are instances where an audio signal is divided into signal components in plural (e.g., 25) bands by bandwidths generally called critical bands such that according as frequency shifts to higher frequency band side, bandwidths are broader. Moreover, in encoding data every respective bands at this time, a predetermined bit allocation is carried out every respective bands, or adaptive bit allocation is carried out every respective bands to carry out quantization. For example, in quantizing coefficient data obtained after undergone the MDCT processing by the above-mentioned bit allocation, quantization is carried out by adaptive allocated number of bits with respect to MDCT coefficient data every respective bands obtained by MDCT processing every respective blocks. As the bit allocation technique, the following two techniques are known.

For example, in the literature "Adaptive Transform Coding of Speech Signals, R. Zelinski, P. Noll IEEE Transactions of Acoustics, Speech, and Signal Processing, vol. ASSP-25, No. 4, August 1977, bit allocation is carried out on the basis of magnitudes of signals every respective bands. In accordance with this system, spectrum of quantizing noise becomes flat and noise energy becomes minimum, but actual noise feeling is not optimum because masking effect is not utilized from a viewpoint of the auditory sense.

Moreover, for example, in the literature "The critical band coder—digital encoding of the perceptual requirements of the auditory system, M. A. Kransner MIT, ICASSP 1980", there is described a technique in which the auditory sense masking effect is utilized to obtain necessary signal-to-noise ratios every respective bands to carry out fixed bit allocation. With this technique, however, even in the case where signal-to-noise ratio characteristic is measured by sine wave input, characteristic values do not become so good values because bit allocation is fixed.

In order to solve these problems, there have been proposed an efficient encoding method and/or an efficient encoding apparatus in which all bits which can be used for bit allocation are used in the state where they are divided into bits for fixed bit allocation pattern determined in advance every respective small blocks and bits for carrying out bit allocation dependent upon magnitudes of signals of respective blocks to allow the divisional ratio to be dependent upon a signal related to an input signal to allow the divisional ratio with respect to the fixed bit allocation pattern to be greater according as spectrum of the signal becomes more smooth.

In accordance with this method, in the case where energies concentrate on a specific component or components as in the case of sine wave input, many bits are allocated to a block or blocks including the spectrum component or components, thereby making it possible to remarkably improve the entire signal-to-noise characteristic. Since the hearing sense of the human being is generally extremely sensitive with respect to signals having sharp spectrum components, improving the signal-to-noise characteristic by using such a method not only merely results improvement in numeric value in measurement, but also is effective for improving sound quality from a viewpoint of the hearing sense.

For the bit allocation method, a large number of methods are proposed in addition to the above. If model relating to the hearing sense is caused to be more fine and ability of the encoding apparatus (encoder) is enhanced, more efficient encoding from a viewpoint of the hearing sense can be made.

Meanwhile, in the case where the above-described DFT or DCT is used as a method for transforming a signal on the time base (hereinafter referred to as a waveform signal) into spectrum components, when transform processing is carried out in time block units consisting of M samples, M number of independent real number data are obtained. Since ordinarily a corresponding time block is caused to overlap with time blocks adjoining in both directions respectively by $M_1$ number of samples in order to lessen connection distortion between time blocks, M number of real number data are quantized with respect to (M–$M_1$) number of samples in DFT or DCT on the average to encode them.

On the contrary, in the case where the above-described MDCT is used as the method of carrying out transform processing into spectrum components, since independent M number of real number data can be obtained from 2M number of samples which are caused to overlap with time blocks adjoining in both directions by M number of samples, M number of real number data are quantized with respect to M number of samples in MDCT on the average to encode them. In the decoding apparatus (decoder), waveform elements obtained by implementing inverse transform processing in respective time blocks from codes obtained by using MDCT in this way are added while allowing them to interfere with each other, thereby making it possible to reconstruct a waveform signal.

Generally, by allowing the time block for transform processing to have greater (longer) length, frequency resolution of spectrum is enhanced so that energies concentrate on a specific spectrum component or components. Accordingly, there is used MDCT such that a corresponding time block is caused to overlap with time blocks adjoining in both directions by halves to carry out transform processing by greater (longer) time block length, and the number of spectrum components thus obtained is not increased with respect to the number of original time samples, thereby making it possible to carry out encoding of an efficiency higher than that in the case where DFT or DCT is used. Moreover, adjacent time blocks are caused to have sufficiently longer overlap portion, thereby making it possible to lessen distortion between blocks of waveform signal.

When there is employed as stated above a method of once decomposing a waveform signal into spectrum components, i.e., frequency components to quantize those frequency components to encode them, quantizing noises are produced also in a waveform signal obtained by decoding those frequency components to synthesize them. In such instances, in the event that original waveform signal suddenly changes, quantizing noise on the waveform signal would become great even at the portion where the original waveform signal is not necessarily large. As a result, since this quantizing noise is not masked by the simultaneous masking, it constitutes an obstacle from a viewpoint of the hearing sense. Quantizing noise produced in this way at an attack portion where sound suddenly becomes large is called pre-echo.

Particularly, in the case where spectrum transform processing is used to decompose a waveform signal into a large number of frequency components, the time resolution might become poor, so pre-echo would be produced for a long time period.

The principle of the operation of generation of pre-echo in the case where spectrum transform processing is used in band division will now be described with reference to FIG. 17.

In the case where quantizing noises are added to plural spectrum components (hereinafter referred to as spectrum signals) obtained by implementing spectrum transform processing to an input waveform signal SW by using a window function shown in (A) of FIG. 17, when inverse spectrum transform processing is implemented to the spectrum signals to which those quantizing noises are added to allow them to be a waveform signal on the time base for a second time, those quantizing noises are extended (spread) over the entirety of the transform block. Here, in the case where input waveform signal SW suddenly becomes large in the middle of the transform block as indicated by in FIG. (B), quantizing noises become large with respect to the waveform signal SW in the section (time period) where the original waveform SW is small. For this reason, the simultaneous masking is not caused to be effective, so such quantizing noises constitute obstruction from a viewpoint of the hearing sense.

Here, if the transform block length of the spectrum transform processing is reduced, occurrence time period of the quantizing noises are also reduced. However, if such an approach is employed, the frequency resolution becomes poor, so encoding efficiency at a quasi-steady state portion becomes poor. As means for solving such a problem, there is proposed a method in which the transform block length is reduced at the sacrifice of the frequency resolution only at the portion where a waveform signal suddenly changes.

FIG. 18 is a view for explaining an example of the prior art which has been devised for the purpose of lessening obstacle from a viewpoint of the hearing sense by such pre-echo. Generally, with respect to a quasi-steady state waveform signal, when the transform block length is elongated (increased), energies concentrate on a specific spectrum component or components. Accordingly, the encoding efficiency becomes higher. However, at the portion where pitch (loudness) of sound suddenly changes, when the transform block length is long, the above-described pre-echo becomes a problem.

In view of the above, if there is employed an approach to apply such a short transform window function to shorten the transform block length as shown in (A) of FIG. 18 at the portion where pitch (loudness) of sound suddenly changes, e.g., the portion where amplitude of an input waveform signal SW suddenly becomes large as shown in (B) of FIG. 18 so that occurrence time period of the pre-echo can be sufficiently short, so called masking in backward direction (backward masking) by the original waveform signal SW is caused to be effective, so obstacle from a viewpoint of the hearing sense is eliminated. In the method of FIG. 18, the transform block length is selectively switched in dependency upon the property of respective portions of the waveform signal by making use of the above fact.

When such a method is employed, the frequency resolution is sufficiently ensured at the quasi-steady state portion, and occurrence time period of pre-echo at the attack portion is sufficiently shortened and is masked by the backward masking. For this reason, efficient encoding can be made.

However, in the case of the method of allowing the transform block length to be changeable (adjustable) in this way, it is necessary that transform means corresponding to transform blocks of different lengths are provided at the encoding unit, and inverse transform means corresponding thereto are provided at the decoding unit. Further, in the case of this method, since the number of spectrum components obtained by transform processing is proportional to length of the transform block length, frequency bands to which respective spectrum components correspond are changed by transform block length. In the case where attempt is made to encode a plurality of spectrum components collectively, e.g., every critical bandwidths, the number of spectrum components included in respective critical bands are also changed. As a result, processing of encoding/decoding becomes troublesome. As stated above, in the method of allowing the transform block length to be changeable, there is the drawback that both the encoding unit and the decoding unit become complicated.

Meanwhile, as a method for solving the problem of the pre-echo while allowing the transform block length to be fixed, there is described in the Japanese patent Application Laid Open No. 152228/1991 a method of carrying out, with respect to an inputted waveform signal, adaptive gain control at all times in dependency upon its power level thereafter to transform it into spectrum signals by using DFT or DCT to carry out encoding. Here, the gain control is to allow its gain to be greater (amplify amplitude) at the portion where power level is small.

FIGS. 19(A)–(C) are views for explaining the principle of the operation of an encoding method and a decoding method using the technology for carrying out adaptive gain control with respect to such an input signal. Moreover, FIGS. 20 and 21 are block diagrams respectively showing outline of the configurations of an encoding apparatus (unit) and a decoding apparatus (unit) based on the above-mentioned method.

In these figures, input terminal 300 of the encoding unit of FIG. 20 is supplied with a waveform signal shown in (A) of FIG. 19, for example. This input waveform signal undergoes, before it is multiplied by transform window function shown in (B) of FIG. 19 so that spectrum transform processing is implemented thereto every block at the encoding unit, calculation of power every small segments by a segment power detecting circuit 301. Then, transient information is detected by a transient detecting circuit 302. Further, at an adaptive gain control circuit 303, the input waveform signal is amplified by a gain control function on the basis of the transient information. This gain control function is a function such that gain is increased at the portion where level of input waveform signal is small, and gain is decreased at the portion where level of the input waveform signal is large. Respective blocks in FIG. 19 are represented by BL1, BL2, BL3.

An output signal from the adaptive gain control circuit 303 is multiplied by transform window function or window function as shown in (B) of FIG. 19 at a window circuit 304. The signal thus processed undergoes orthogonal transform processing such as DFT or DCT, etc. at a spectrum transform circuit 305, and undergoes normalization/quantization at a normalizing/quantizing circuit 306. An output from the normalizing/quantizing circuit 306 is sent to an encoding circuit 307, at which encoding is implemented thereto along with the transient information from the transient detecting circuit 302. The encoded signal thus obtained is taken out as a code train signal from output terminal 308.

Distortion of the waveform signal resulting from amplifying processing by the gain control junction is corrected by multiplying a waveform signal obtained after undergone inverse transform processing by inverse number of the above-described gain control function at a decoding unit as shown in FIG. 21.

Namely, input terminal 310 of FIG. 21 is supplied with a code train signal which has been taken out from the output terminal 308 of FIG. 20, and has been undergone transmission or recording and reproduction as occasion demands. This code train signal undergoes, at a decoding circuit 311, decoding opposite to encoding at the encoding circuit 307. The spectrum component is sent to an inverse normalizing/inverse quantizing circuit 312, and the transient information is sent to a gain control correcting circuit 315. An output from the inverse normalizing/inverse quantizing circuit 312 undergoes, by an inverse spectrum transform circuit 313, inverse orthogonal transform processing such as Inverse DFT (IDFT) or Inverse DCT (IDCT), etc., and is then sent to an adjacent block synthesis circuit 314, at which the signal thus processed is synthesized with a signal of an adjacent block. The synthesized signal thus obtained is sent to the gain control correction circuit 315. At the gain control correction circuit 315, the synthesized signal is corrected by allowing it to be multiplied by inverse number of the gain control function based on the transient information. The waveform signal thus obtained is taken out though output terminal 316.

In this method, the encoding unit is operative, prior to implementation of transform processing into spectrum signal, to carry out a gain control where the gain is suddenly lowered at the attack portion, and to carry out such a gain control to increase the gain for a second time in dependency upon attenuation at portions except for the attack portion. On the other hand, the decoding unit outputs a signal to which an inverse gain control for correcting gain control has been implemented to a waveform signal obtained after undergone inverse spectrum transform processing. When such an approach is employed, quantizing noise at a signal portion of small amplitude where masking level is caused to be low is suppressed. Moreover, since the transform block length can be fixed at all times, the configurations of the encoding unit and the decoding unit can be simplified.

However, with this method, it is necessary to carry out gain control also at the time of attenuation of waveform signal. Since implementation of gain control generally results in distortion of the original waveform signal, distribution of dispersed energy would be provided where waveform signal is transformed into spectrum signals, thus making it difficult to carry out efficient encoding. Since forward masking in which sound produced later is masked by former sound (sound produced forward in point of time) is effectively exerted particularly at the time of attenuation of waveform signal, it is important to lower the noise level itself rather than to control occurrence of quantizing noise in point of time. In addition, it is not preferable, also from a viewpoint of quantity subject to processing, to carry out processing of gain control at all times.

As another method of preventing pre-echo while allowing the transform block length to be fixed, e.g., technologies as disclosed in the Japanese Patent Application Laid Open No. 201526/1986 publication and the Japanese Patent Application Laid Open No. 7023/1988 publication are known. In these publications, there is proposed a method in which, at the encoding unit, an input waveform signal is extracted every time block to allow the waveform signal thus extracted to undergo windowing thereafter to detect an attack portion to amplify a waveform signal of small amplitude immediately before the attack portion thereafter to transform it into spectrum signals by using DFT or DCT to encode them; and, at the decoding unit, inverse transform processing such as IDFT or IDCT, etc. is implemented to restored spectrum signal thereafter to implement a processing for correcting that the signal immediately before the attack portion has been amplified at the encoding unit to thereby prevent pre-echo. Also in this case, the transform block length can be fixed at all times, and the configurations of the encoding unit and the decoding unit can be simplified.

FIG. 22 explains the principle of the operation with respect to encoding and decoding using the windowing processing technology disclosed in the Japanese Patent Application Laid Open No. 201526/1986 publication and the Japanese Patent Application Laid Open No. 7023/1988 described above, and FIGS. 23 and 24 are block diagrams showing outline of the configurations of an encoding apparatus (unit) and a decoding apparatus (unit) using the above-mentioned technology.

Input terminal 400 of FIG. 23 is supplied with a waveform signal as shown in (A) of FIG. 22, for example. At a window circuit 401, time windows sequentially successive in point of time and overlapping with each other are set to multiply the waveform signal by window function shown in (B) of FIG. 22 (characteristic curve referred to in the above-mentioned Japanese Patent Application Laid Open No. 201526/1986 publication) so as to extract the waveform signal by the time windows. An attack portion detecting circuit 402 detects a portion (attack portion) where amplitude of the input waveform signal suddenly changes. A gain control circuit 403 is operative so that in the case where the attack portion is detected, it carries out a processing so as to amplify very small amplitude portion, and in the case where no attack portion is detected, it does not carry out amplifying processing. An output from the gain control circuit 403 is sent to a spectrum transform circuit 404, at which it is transformed into spectrum signal by DFT or DCT, etc. The spectrum signal thus obtained is normalized and quantized at a normalizing/quantizing circuit 405, and is then encoded by an encoding circuit 406. The encoded signal thus obtained is taken out as a code train signal from output terminal 407.

Moreover, in the decoding unit shown in FIG. 24, decoding opposite to encoding at the encoding circuit 406 is implemented, at a decoding circuit 411, to the code train signal delivered to input terminal 410. The decoded signal thus obtained is sent to an inverse normalizing/inverse quantizing circuit 412. An output from the inverse normalizing/inverse quantizing circuit 412 undergoes inverse transform processing into signal in the time region by IDFT or IDCT, etc. at an inverse spectrum transform circuit 413. The inverse-transformed signal thus obtained is sent to a gain control correction circuit 414, at which processing for correcting the gain control processing implemented at the encoding unit is implemented. An output from the gain control correction circuit 414 is sent to an adjacent block synthesis circuit 415, at which it is synthesized with a signal of an adjacent block. The synthesized signal thus obtained is taken out through output terminal 416.

In the case of this method, since detecting processing of the attack portion is carried out with respect to a deformed (modified) waveform signal after the window function is implemented as described above, portions of large amplitude would be relieved at both ends of block. For example, as shown in FIG. 22, it may take place that no attack portion is detected at the block BL1 and attack portion is detected only at the next block BL2. However, in the case where the above-mentioned DFT or DCT is used as the spectrum transform processing, if inverse spectrum transform processing is implemented to spectrum components obtained by implementing the spectrum transform processing, original time series block can be completely restored. For this reason, if correcting processing of gain control is implemented every block at the decoding unit, no problem is arisen.

However, in the case where, as a spectrum transform processing for enhancing (improving) efficiency of encoding, there is used such a transform processing to allow a corresponding waveform element to interfere with waveform elements of blocks adjoining in both directions at the time of inverse transform processing to compose a waveform signal as in the case of IMDCT, for example, when there is employed such a method to extract waveform signals every time blocks to independently detect attack portions as described above, inconsistency may take place between blocks in detection of the attack portion and amplifying processing immediately before that detection thereof, failing to correctly reconstruct a waveform signal. However, it is to be noted that since the transform processing for allowing a corresponding waveform signal to interfere with waveform signals of adjacent blocks at the time of inverse transform processing can set the block length to a longer value without increasing the number of independent spectrum components to be encoded as previously described, such transform processing is effective for enhancing local concentration of energies after spectrum transform processing to carry out efficient encoding.

The reason why MDCT cannot be used in the case where there is employed the conventional method of extraction by window thereafter to carry out gain control will now be described.

Initially, explanation will be briefly given in connection with the MDCT. In order to implement MDCT to a time series signal x(n), an approach is employed to extract a time series signal by blocks of length 2M overlapping with blocks adjoining in both directions by M samples to multiply it by transform window $w_1(n)$ as indicated by the following formula (1) thereafter to implement transform processing of MDCT indicated by the following formula (2) thereto.

$$x_{1,J}(n) = w_1(n) \times (n + JM) \ 0 \leq n < 2 \quad (1)$$

$$X_J(k) = \frac{2}{M} \sum_{n=0}^{2M-1} x_{1,J}(n)\cos\left(\frac{\pi(2k+1)(2n+M+1)}{4M}\right) \quad (2)$$

$$0 \leq k < M$$

When such an approach is employed, M number of independent spectrum coefficients $X_J(k)$ in total can be obtained. In these formulas (1) and (2), n indicates sample No., and J indicates block No.

Then, in order to reproduce the original time series signal from the M number of independent spectrum coefficients $X_J(k)$ in total of the formula (1), transform processing of IMDCT as indicated by the following formula (3) is implemented to spectrum coefficient $X_J(k)$ thereafter to multiply it by inverse transform window $w_2(n)$ as indicated by the following formula (4) to further synthesize the multiplied value with blocks adjoining in both directions as indicated by the following formula (5).

$$x_{2,J} = \sum_{n=0}^{M-1} X_J(k)\cos\left(\frac{\pi(2k+1)(2n+M+1)}{4M}\right) \quad (3)$$

$$0 \leq n < 2M$$

$$x_{3,J}(n) = w_2(n)x_{2,J}(n) \ 0 \leq n < 2M \quad (4)$$

$$y(n+JM) = x_{3,J-1}(n+M) + x_{3,J}(n) \ 0 \leq n < M \quad (5)$$

Assuming now that $w_2(n)$ of the formula (4) has the relationship indicated by the following formulas (6), (7) with respect to $w_1(n)$, y(n) becomes in correspondence with the original signal x(n)

$$w_1(n)w_2+w_1(n+M)w_2(n+M)=1 \quad 0<n<M \quad (6)$$

$$w_1(2M-n-1)w_2(n+M)=w_1(M-n-1)\,W_2(n) \quad 0<n<M \quad (7)$$

However, since $x_{1,J}(n)$ and $x_{2,J}(n)$ are not in correspondence with each other, in the case where gain control function $G_J(n)$ every block is used to carry out gain control thereafter to multiply that function by transform window function $w_1(n)$ as indicated by the following formula (8) in place of the formula (1) every block $$x_{1,J}(n)=w_1(n)g_J(n)x(n+JM) \quad 0 \leq n < 2M \quad (8)$$

to carry out correcting processing of gain control to determine $g(n)$ as indicated by the following formulas (9), (10) in place of the formula (5), this value is not necessarily in correspondence with $x(n)$.

$$x_{4,J}=\frac{x_{3,J}(n)}{g_J(n)} \quad 0 \leq n < 2M \quad (9)$$

FIG. 25 is a view for explaining this state. In FIG. 25, (A) indicates inverse number of the gain control function $g_J(n)$, (B) indicates input signal $x(n)$, (C) indicates $x_{1,J}(n)$ of the above-mentioned formula (1), (D) indicates $x_{2,J}(n)$ of the above-mentioned formula (3), (E) indicates $x_{4,J}(n)$ of the above-mentioned formula (9), and (F) indicates a waveform signal within a block of the block No. J=2 in the case where $y(n)$ of the above-mentioned formula (10) is used. With respect to (A), (C), (D) and (E), indication is made in connection with three blocks of block No. J=1, 2, 3. In this case, there are employed sample numbers caused to be value suitably shifted.

Since gain control functions $g_2(n)$ and $g_3(n)$ are different from each other as stated above, a waveform signal which does not appear in the original signal $x(n)$ takes lace at the latter part portion of block of J=2 of signal $y(n)$ shown in (F), thus failing to correctly reconstruct waveform signal.

It is to be noted, as previously described, when there is employed the method of carrying out adaptive gain control at all times in dependency upon power level of a waveform signal, not only gain control at the attack portion but also gain control at the attenuating portion are required, but when gain control is implemented, since spectrum components are generally spread (dispersed) on the frequency base in the case where transform processing into spectrum signals is carried out, the method of unnecessarily carrying out gain control leads to lowered encoding efficiency. In addition, in the case of this method, since adaptive control at the attenuating portion is required, there results increased quantity subject to processing.

Moreover, in the methods described in the embodiments of these methods of utilizing gain control, gain controlled variable at the attack portion was fixed to determine in dependency upon presence or absence of the attack portion whether or not gain control of a predetermined value is carried out. Since pre-echo is a noise characteristic value obtained as the result of the fact that quantizing noise produced in the frequency region is transformed into that in the time region, if compression rate of encoding is increased and quantizing noise in the frequency region becomes great, deterioration of sound quality by pre-echo becomes great. On the other hand, since a method of carrying out gain control more than required results in dispersed energy distribution, such a method is not desirable from a viewpoint of implementation of efficient compression. Accordingly, with such a method to alternatively select in dependency upon presence or absence of detection of the attack portion whether or not gain control of a predetermined value is carried out, particularly in the case where compression rate is high, it was difficult to prevent deterioration of sound quality.

This invention has been made in view of such actual circumstances, and its object is to provide an information encoding method and an information encoding apparatus, an information decoding method and an information decoding apparatus, an information recording medium, and an information transmission method such that in the case where such a transform processing to allow a corresponding waveform element to interfere with waveform elements of blocks adjoining in both directions at the time of inverse transform processing to compose a waveform signal as in the case of IMDCT is used, amplification processing at the encoding apparatus and corresponding correction processing at the decoding apparatus are caused to be carried out without inconsistency between blocks, thereby making it possible to prevent pre-echo by simple configuration by using spectrum transform processing of good encoding efficiency.

Another object of this invention is to provide an information encoding method and an information encoding apparatus, an information decoding method and an information decoding apparatus, an information recording medium, and an information transmission method such that gain control corresponding to the degree of amplitude change of the attack portion is permitted to be conducted, that more efficient encoding, decoding, recording or transmission of higher sound quality is permitted to be carried out, that the configuration is also simple, and that pre-echo can be effectively prevented.

DISCLOSURE OF THE INVENTION

To achieve the above-described objects, an information encoding method according to this invention is directed to an information encoding method for encoding an input waveform signal, the method comprising the steps of: determining, on the basis of a gain control function of a block forward in point of time at an overlapping portion of a current block and the forward block, a gain control function of at least the overlapping portion of the current block; controlling gain of a signal portion of the input waveform signal corresponding to the current block by using at least the determined gain control function of the overlapping portion; extracting the gain-controlled signal portion so that a portion of samples of the adjacent block has the overlapping portion on the time base to transform it into a signal on the frequency base; and encoding the transformed signal and control information for gain control.

Moreover, an information encoding method according to this invention is directed to an information encoding method for encoding an input waveform signal, the method comprising the steps of: detecting an attack portion where amplitude suddenly becomes great of the input waveform signal; selectively determining a gain control function in dependency upon the characteristic of the attack portion; controlling gain of the attack portion of the input waveform signal on the basis of the determined gain control function; transforming the gain-controlled input waveform signal on the time base into a signal on the frequency base; and encoding the transformed signal and control information for gain control.

An information encoding apparatus according to this invention is directed to an information encoding apparatus adapted for encoding an input waveform signal, the apparatus comprising: means for determining, on the basis of a gain control function of a block forward in point of time at an overlapping portion of a current block and the forward block, a gain control function of at least the overlapping portion of the current block; gain control means for controlling gain of a signal portion of the input waveform signal corresponding to the current block by using at least the determined gain control function of the overlapping portion; transform means for extracting the gain-controlled signal portion so that a portion of samples of the adjacent block has the overlapping portion on the time base to transform it into a signal on the frequency base; and encoding means for encoding the transformed signal and control information for gain control.

Moreover, an information encoding apparatus according to this invention is directed to an information encoding apparatus adapted for encoding an input waveform signal, the apparatus comprising: means for detecting an attack portion where amplitude suddenly becomes great of the input waveform signal; means for selectively determining a gain control function in dependency upon the characteristic of the attack portion; means for controlling gain of the attack portion of the input waveform signal on the basis of the determined gain control function; means for transforming the gain-controlled input waveform signal on the time base into a signal on the frequency base; and means for encoding the transformed signal and control information for gain control.

An information decoding method according to this invention is directed to an information decoding method for decoding a waveform signal from an encoded signal, the method comprising the steps of: decoding the encoded signal to take out therefrom a transformed signal and control information; carrying out inverse transform processing for allowing waveform elements to interfere with each other between adjacent blocks with respect to the transformed signal; determining, on the basis of the control information and a gain control function of a block forward in point of time at an overlapping portion of a current block and the forward block, a gain control function of at least the overlapping portion of the current block; controlling gain of a signal to which inverse-transform processing has been implemented corresponding to the current block by using at least the determined gain control function of the overlapping portion to restore the original waveform signal.

Moreover, an information decoding method according to this invention is directed to an information decoding method for decoding a waveform signal from an encoded signal, the method comprising the steps of: decoding the encoded signal to take out therefrom a transformed signal and control information; inversely transforming the transformed signal from a signal on the frequency base to a signal on the time base; selectively determining a gain control function on the basis of the control information; and controlling gain of a signal portion to which inverse-transform processing has been implemented corresponding to an attack portion where amplitude suddenly becomes large by using at least the determined gain control function to restore the original waveform signal.

An information decoding apparatus according to this invention is directed to an information decoding apparatus adapted for decoding a waveform signal from an encoded signal, the apparatus comprising: means for decoding the encoded signal to take out therefrom a transformed signal and control information; inverse-transform means for carrying out inverse-transform processing to allow waveform elements to interfere with each other between adjacent blocks with respect to the transformed signal; means for determining, on the basis of a gain control function of a block forward in point of time of at least overlapping portion of a current block and the forward block, a gain control function of at least the overlapping portion of the current block; and gain control means for controlling gain of a signal portion to which inverse-transform processing has been implemented corresponding to the current block by using at least the determined gain control function of the overlapping portion to restore the original waveform signal.

Moreover, an information decoding apparatus according to this invention is directed to an information decoding apparatus adapted for decoding a waveform signal from an encoded signal, the apparatus comprising: means for decoding the encoded signal to take out therefrom a transformed signal and control information; means for inversely transforming the transformed signal from a signal on the frequency base to a signal on the time base; means for selectively determining a gain control function on the basis of the control information; and means for controlling gain of a signal portion to which inverse-transform processing has been implemented corresponding to an attack portion where amplitude suddenly becomes great by using at least the determined gain control function to restore the original waveform signal.

An information recording medium according to this invention is directed to an information recording medium where encoded information are recorded, wherein spectrum signals and control information are recorded therein, the spectrum signal being generated by determining, on the basis of a gain control function of a block forward in point of time at an overlapping portion of a current block and the forward block, a gain control function of at least the overlapping portion of the current block to control gain of a signal portion of the input waveform signal corresponding to the current block by using at least the determined gain control function of the overlapping portion to extract the gain-controlled signal portion so that a portion of samples of the adjacent block has the overlapping portion on the time base, the control information including information for gain control.

Moreover, an information recording medium according to this invention is directed to an information recording medium where encoded information are recorded, wherein spectrum signals and control information are recorded therein, the spectrum signal being generated by detecting an attack portion where amplitude suddenly great of an input waveform signal to selectively determine a gain control function in dependency upon the characteristic of the attack portion to control gain of the attack portion of the input waveform signal on the basis of the determined gain control function to transform the gain-controlled input waveform signal on the time base into a signal on the frequency base, the control information including control information for the gain control.

An information transmission method according to this invention is directed to an information transmission method for carrying out transmission of encoded information, the method comprising the steps of: carrying out, in block units, transmission of spectrum signals generated by determining, on the basis of a gain control function of a block forward in point of time at an overlapping portion of a current block and the forward block, a gain control function of at least the overlapping portion of the current block to control gain of a signal portion of the input waveform signal corresponding to the current block by using at least the determined gain control function of the overlapping portion to extract the gain controlled signal so that a portion of samples of the adjacent block has the overlapping portion on the time base to transform it into a signal on the frequency base; and carrying out transmission of control information for gain control in block units.

Moreover, an information transmission method according to this invention is directed to an information transmission method for carrying out transmission of encoded information, the method comprising the steps of: carrying out, in block units, transmission of spectrum signals generated by detecting an attack portion where amplitude suddenly becomes large of an input waveform signal to selectively determine a gain control function in dependency upon the characteristic of the attack portion to control gain of the attack portion of the input waveform signal on the basis of the determined gain control function to transform the gain-controlled input waveform signal on the time base into a signal on the frequency base; and carrying out transmission of control information for gain control in block units.

In this invention, gain control processing in encoding is determined in dependency upon a gain control function of the forward block at the portion overlapping with the forward block, whereby if there is no loss by encoding in the case where inverse transform is carried out, it is possible to make a correction such that the original waveform signal can be restored. Thus, pre-echo can be prevented by simple configuration by using transform processing of good encoding efficiency.

In addition, in this invention, variable selectively determined from plural kinds of magnitudes is used as gain controlled variable at the portion where a waveform signal suddenly becomes great, whereby gain control corresponding to the degree of amplitude change of the attack portion can be made. Thus, encoding, decoding, recording and transmission of higher efficiency and higher sound quality can be carried out.

BRIEF DESCRIPTION OF THE DRAWINGS

FIG. 22 is a view for explaining the principle of the operation of conventional encoding/decoding using the windowing processing technology.

FIG. 25 is a view for explaining the problems in the case where MDCT is used.

BEST MODE FOR CARRYING OUT THE INVENTION

Preferred embodiments of this invention will now be described with reference to the attached drawings.

Figure 1:
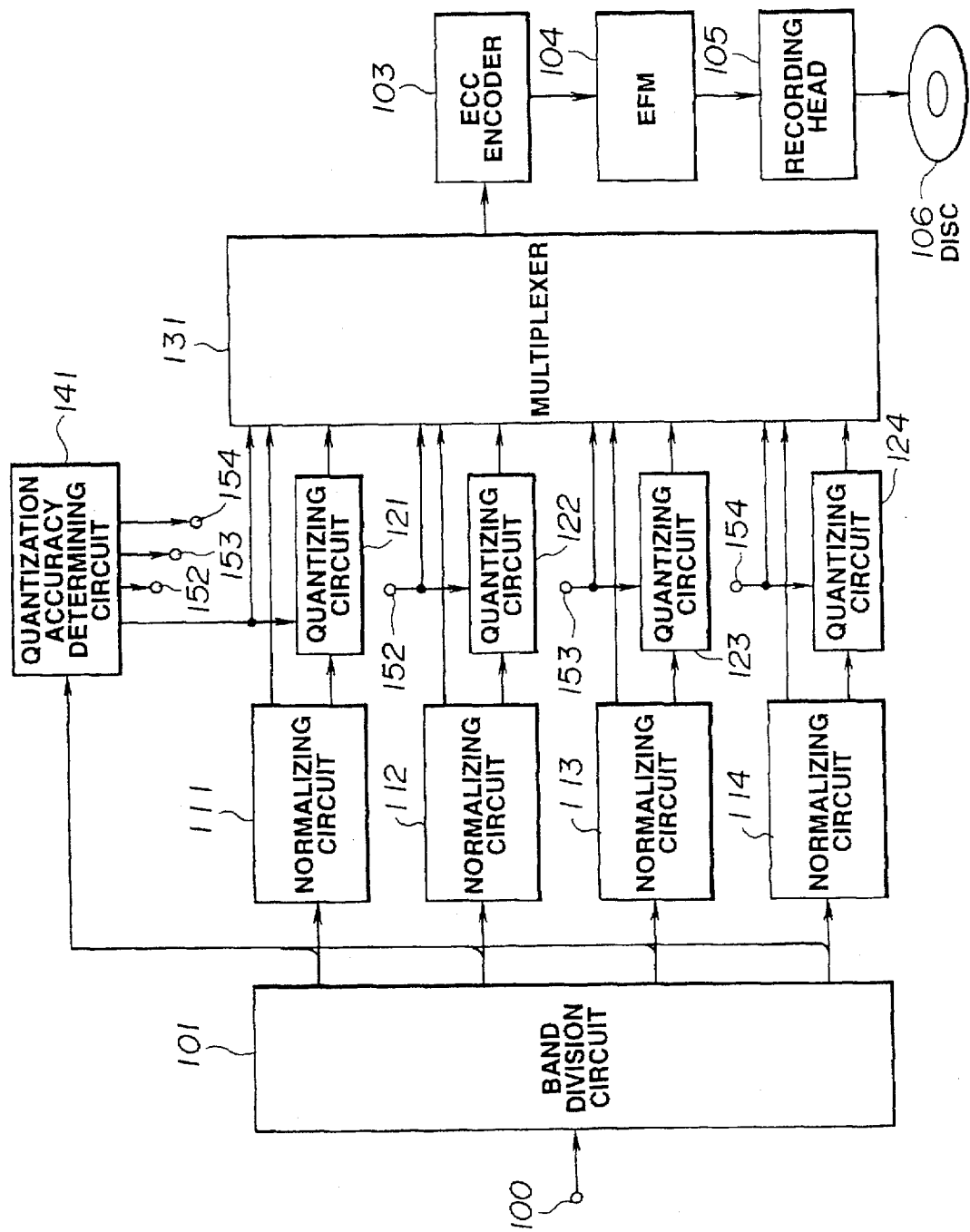
FIG. 1 is a block circuit diagram showing outline of the configuration of an encoding apparatus to which an embodiment of this invention is applied.

FIG. 1 shows a block circuit diagram of an embodiment of an encoding apparatus (unit) to which an information encoding method of this invention is applied.

In FIG. 1, an audio signal inputted to the encoding unit through input terminal 100 is subjected to band division by a band division circuit 101. As the band division means in the band division circuit 101, division means by the previously described filter such as QMF, etc. may be employed, or means for grouping, every bands, spectrum components obtained by the spectrum transform processing such as MDCT, etc may be employed. Moreover, there may be employed means for carrying out spectrum transform processing with respect to audio signals once divided into several bands by filter to carry out, every bands, grouping of the spectrum components thus obtained. Further, widths of respective bands by the band division may be uniform, or may be uneven so as to become in correspondence with, e.g., critical bandwidths. It is to be noted that while the entire frequency band is divided into four bands in the example of FIG. 1, it is a matter of course that the number of division of bands may be further increased, or may be decreased.

The signals which have undergone band division by the band division circuit 101 undergo normalization by normalizing circuits 111, 112, 113, 114 corresponding to respective bands every predetermined time block. From these normalizing circuits 111, 112, 113, 114, normalization coefficients and normalized signals are respectively outputted. These normalized signals are respectively quantized by quantizing circuits 121, 122, 123, 124 on the basis of quantization accuracy information which are outputs of a quantization accuracy determining circuit 141, at which they are changed into normalized and quantized signals. Additionally, in FIG. 1, quantization accuracy information sent to the quantizing circuit 122 of quantization accuracy information to the respective quantizing circuits 121, 122, 123, 124 from the quantization accuracy determining circuit 141 is sent to a corresponding circuit through a terminal 152, quantization accuracy information sent to the quantizing circuit 123 is sent to a corresponding circuit through a terminal 153, and quantization accuracy information sent to the quantizing circuit 124 is sent to a corresponding circuit through a terminal 154.

The normalized and quantized signals from the quantizing circuits 121, 122, 123, 124, the respective normalization coefficients from the normalizing circuits 111, 112, 113, 114, and respective quantization accuracy information from the quantization accuracy determining circuit 141 are caused to be sequential code trains by a multiplexer 131, and are delivered to an ECC encoder 103. The ECC encoder 103 adds error correction code to the delivered code train. An output from the ECC encoder 103 is modulated by an EFM circuit 104, and is delivered to a recording head 105. The recording head 105 records the code train signal outputted from the EFM circuit 104 onto a disc 106.

While, in the example of FIG. 1, the quantization accuracy determining circuit 141 calculates the quantization accuracy on the basis of respective signals which have undergone band division by the band division circuit 101, it is possible to calculate such quantization accuracy from audio signals delivered through terminal 100, which have not yet undergone band division, or to calculate such quantization accuracy on the basis of normalization coefficients from the respective normalizing circuits 111, 112, 115, 114. Further, calculation at the quantization accuracy determining circuit 141 can be carried out on the basis of the auditory sense phenomenon such as masking effect, etc., and the respective quantization accuracy information are outputted through the multiplexer 131 as described above, and is sent to a decoding unit through the disc 106. For this reason, the auditory sense model used in the encoding unit can be arbitrarily set.

Figure 2:
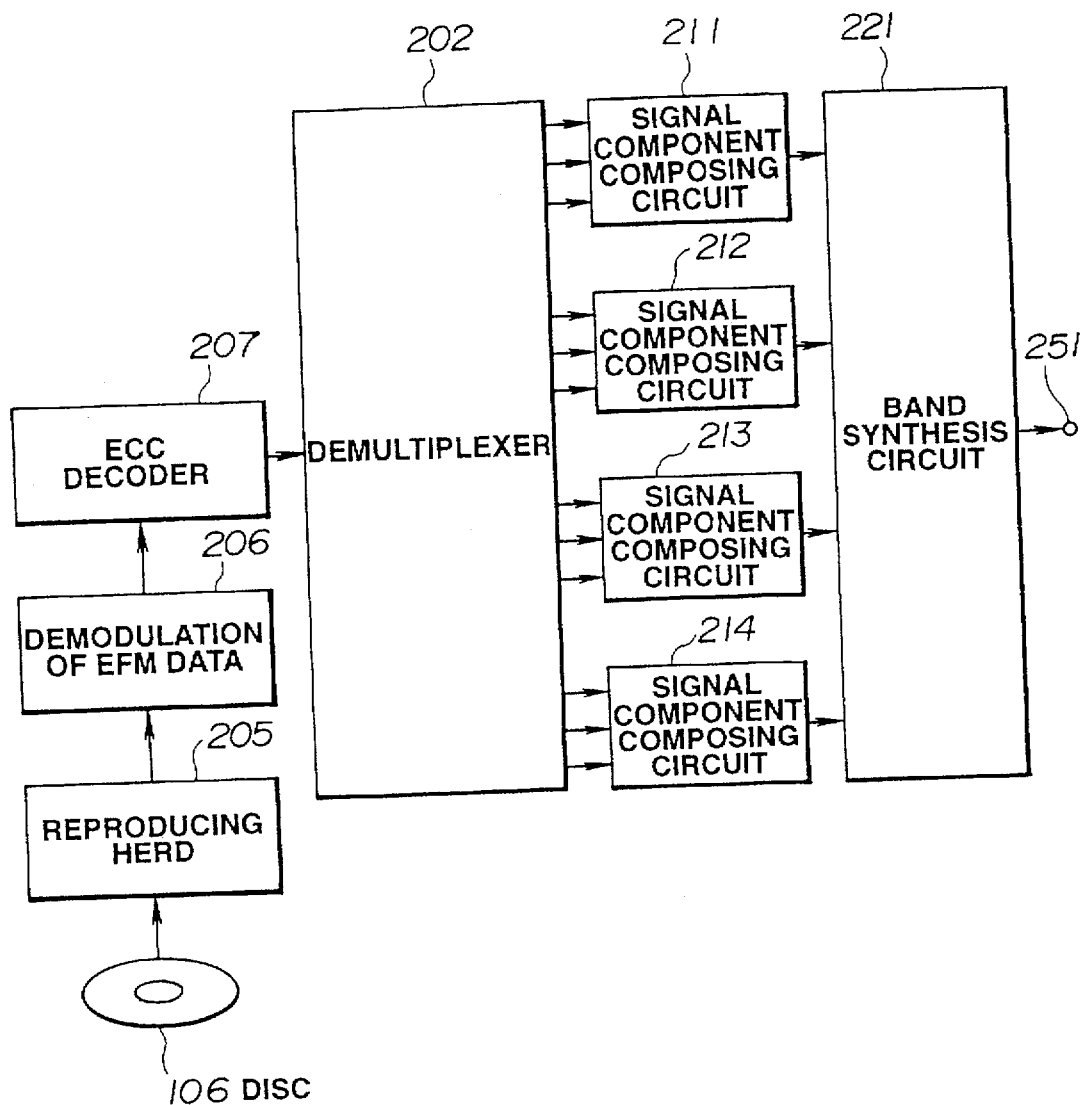
FIG. 2 is a block circuit diagram showing outline of the configuration of a decoding apparatus to which an embodiment of this invention is applied.

On the other hand, FIG. 2 shows a circuit diagram of an embodiment of a decoding apparatus corresponding to the encoding apparatus of FIG. 1 to which an information decoding method of this invention is applied.

In FIG. 2, a code train signal reproduced through a reproducing head 205 from the disc 106 is delivered to a circuit 206 for demodulation of EFM data. The EFM data demodulating circuit 206 demodulates the inputted code train signal. The demodulated code train is delivered to an ECC decoder 207, at which error correction is carried out. The error-corrected code train is sent to a demultiplexer 202, at which it is separated and restored into quantization accuracy information, normalization coefficients, and normalized and quantized signals every respective bands. The quantization accuracy information, the normalization coefficients, and normalized and quantized signals every respective bands are respectively sent to signal component composing circuits 211, 212, 213, 214 corresponding to respective bands, at which signal components are composed every respective bands. Signal components from these respective signal component composing circuits 211, 212, 213, 214 are synthesized by a band synthesis circuit 221 so that an audio signal is provided. The audio signal thus obtained is outputted from terminal 251.

The principle of a method of suppression of the pre-echo by this invention will now be described. Namely, in the embodiment of this invention, in the case where there is used transform processing to allow waveform signals of adjacent blocks to interfere with each other to synthesize them at the time of inverse transform processing, such as, for example, the previously described inverse Modified Discrete Cosine Transform, i.e., IMDCT, gain control is carried out while allowing waveform elements (signal components) to be related to each other between blocks so that gain control is correctly carried out. Explanation will be given below in connection with such gain control.

Initially, gain control function $g_J(n)$ defined at intervals (time period) respectively having length 2M, which satisfies the condition of the following formula (11) is assumed to correspond to respective blocks.

$$g_J(n) = g_{J-1}(n+M) \quad 0 \leq n < M \tag{11}$$

It is now assumed that an original waveform signal is $x(n)$, and has the relationship of the following formula (12) with respect to another signal $s(n)$.

$$x(n+JM) = g_J(n)s(n+JM) \quad 0 \leq n < M \tag{12}$$

At this time, when $x_{1,J}(n)$ of the above-mentioned formula (1) is calculated, $x_{1,J}(n)$ is indicated by the following formula (13). It can be interpreted that this formula indicates that $x_{1,J}(n)$ is obtained by carrying out gain control out by using gain control function $g_J(n)$ with respect to $s(n)$ thereafter to multiply it by transform window function.

$$\begin{aligned} x_{1,J} &= w_1(n)g_J(n)s(n+JM) \ 0 \leq n < M \\ &= w_1(n)g_{J+1}(n-M)s(n+JM) \ M \leq n < 2M \\ &= w_1(n)g_J(n)s(n+JM) \ 0 \leq n < 2M \end{aligned} \tag{13}$$

When the relationship of the above-mentioned formula (11) and the fact that y(n) determined at the above-mentioned formula (5) is x(n) are utilized to calculate the right side of the above-mentioned formula (10), it is seen that s(n) can be restored as indicated by the following formula (14).

$$\begin{aligned} x_{4,J-1}(n+M) + x_{4,J}(n) &= \frac{x_{3,J}(n+M)}{g_{J-1}(n+M)} + \frac{x_{3,J}(n)}{g_J(n)} \\ &= \frac{x_{3,J}(n+M) + x_{3,J}(n)}{g_J(n)} \\ &= \frac{x(n+JM)}{g_J(n)} \\ &= s(n+JM) \ 0 \leq n < M \end{aligned} \tag{14}$$

Since x(n) was an arbitrary waveform signal, s(n) can also take an arbitrary waveform signal. Namely, even in the case where MDCT is used, if gain control function $g_j(n)$ maintains the relationship of the formula (11), it is possible to restore a waveform signal into the original waveform signal.

Further, even if $x_{1,j}(n)$ is defined by the following formula (15) obtained by multiplying gain control function $g_j(n)$ by $P_j$ in place of the above-mentioned formula (8), it is possible to restore a waveform signal into the original waveform signal.

$$x_{1,j}(n)=w_1(n)(P_j g_j(n))s(n+JM)\ 0 \leq n < 2M \tag{15}$$

If attention is drawn to the fact that transformation of the above-mentioned formulas (2), (3), (4) are all linear, $x_{4,j}(n)$ is determined by the following formula (16) in place of the above-mentioned formula (9), whereby $x_{4,j}(n)$ which is the same as the formula (9) can be obtained.

$$x_{4,j}(n) = \frac{x_{3,j}(n)}{P_j g_j(n)}\ 0 \leq n < 2M \tag{16}$$

Eventually, it is seen that if the relationship of the following formula (17) holds between respective gain control functions $g_j(n)$, also in the case where MDCT is used, when an approach is employed to carry out gain control at the time of encoding, and to carry out correction of the gain control at the time of decoding, it is possible to output a waveform signal without producing unnecessary distortion of waveform signal.

$$g_j(n)=R_j g_{j-1}(n+M)\ 0 \leq n < M \tag{17}$$

Figure 3A:
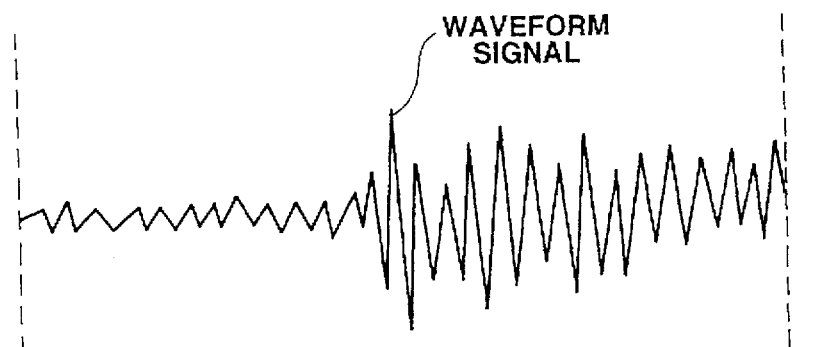
FIG. 3 is a view for explaining the operation of gain control at the time of windowing processing in the embodiment of this invention.
Figure 3B:
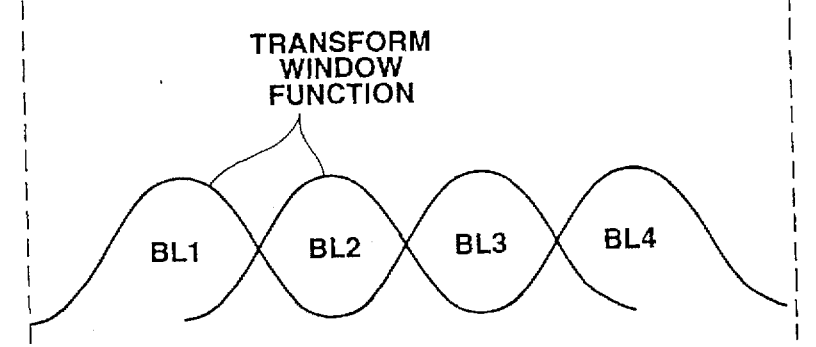
Figure 3C:
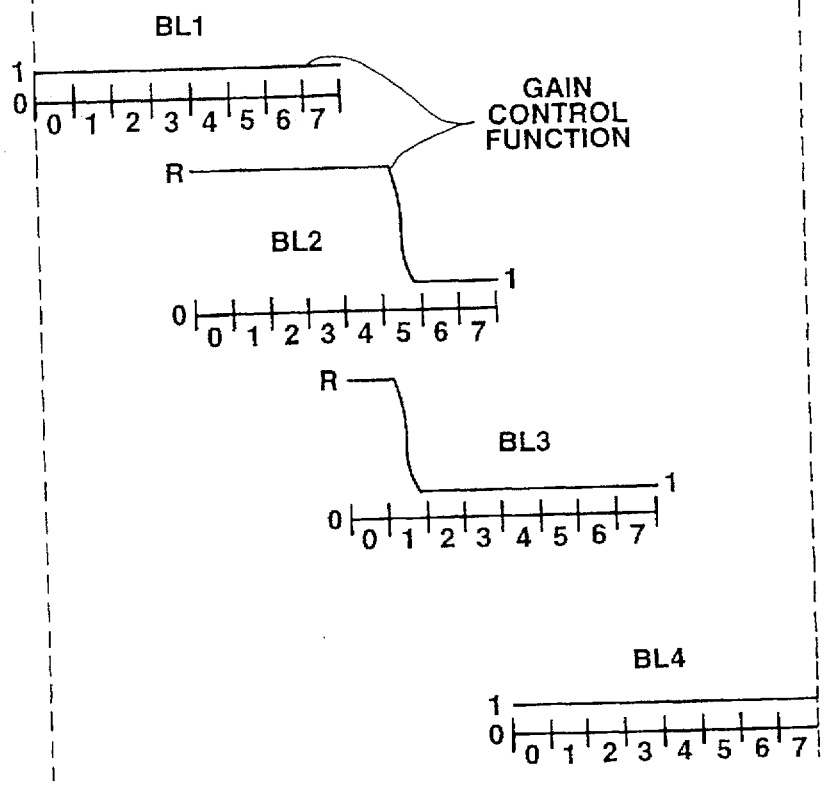

FIG. 3 is a view for explaining gain control operation at the time of windowing processing in the case where the above-described method is applied.

Respective gain control functions are multiple of coefficient which is the actual overlapping portion with respect to other gain control functions overlapping therewith. In the case of this example, in respective blocks, e.g., block BL1 and block BL4, their amplitudes are greatly different from each other, but no attack portion is detected in both blocks. Accordingly, transformation (modification) of waveform element is not carried out. On the contrary, in the block BL2 and the block BL3, since the attack portion exists at the latter half portion of the block BL2, when the block BL3 is assumed to be current block, gain control function of the latter half portion which is overlapping portion of the block BL2 forward in point of time is caused to be a gain control function of the block BL3 as it is, or a function obtained by multiplying the gain control function by constant is caused to be gain control function of the block BL3.

Figure 4:
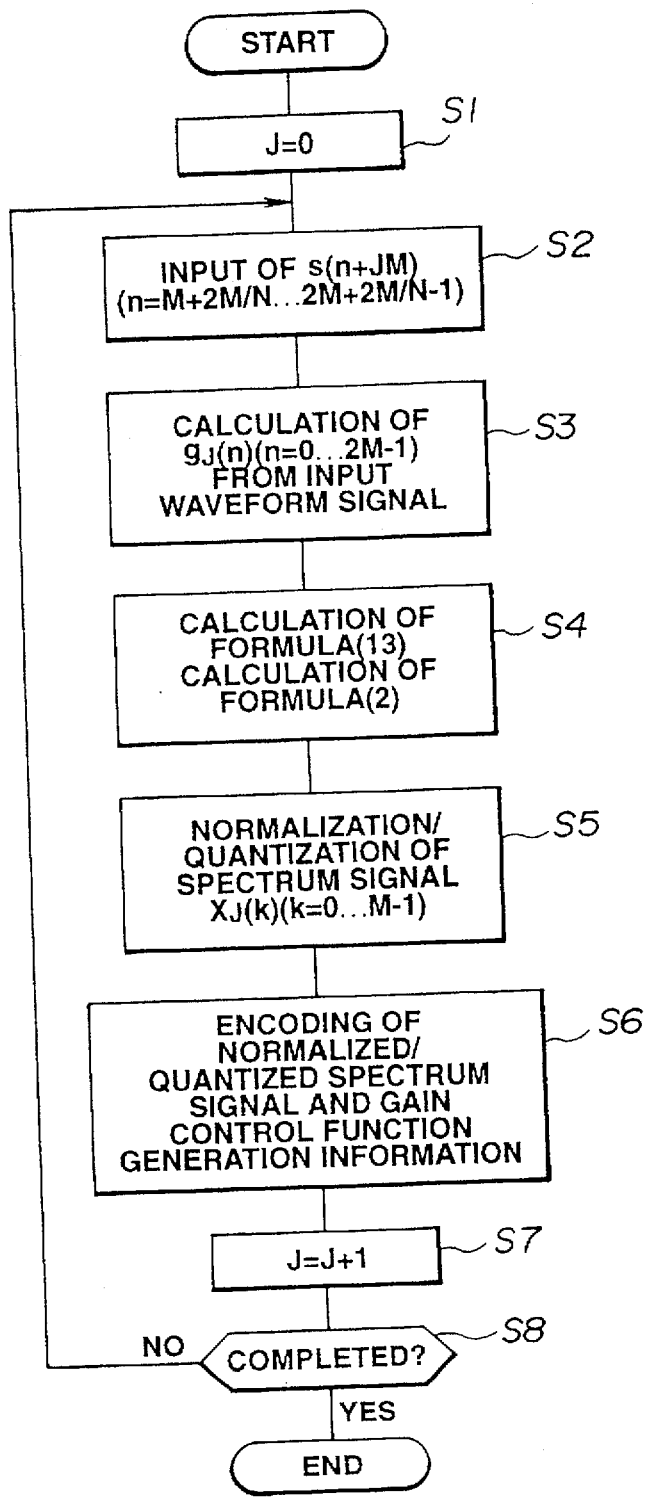
FIG. 4 is a flowchart showing outline of an example of processing procedure in an encoding method of an embodiment of this invention.
Figure 5:
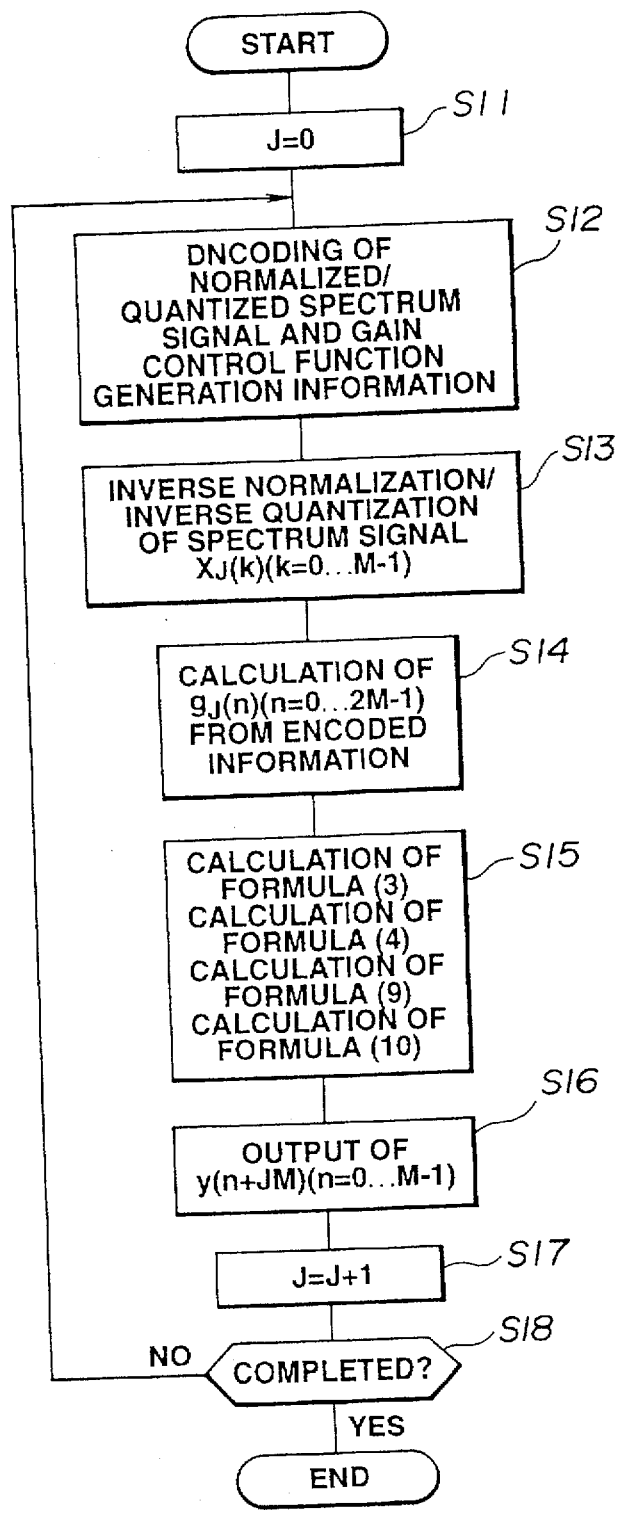
FIG. 5 is a flowchart showing outline of an example of processing procedure of a decoding method of an embodiment of this invention.

FIGS. 4 and 5 are flowcharts showing examples of processing procedure in the case where the above-described technique is actually applied to encoding and decoding of signal.

In the example of the encoding method of FIG. 4, as explained later with reference to FIG. 6, a block of length of 2M having portions overlapping with blocks adjoining in both directions by halves is decomposed into N number of divided sub blocks to constitute a gain control function.

Initially, at step S1, block No. J is set to zero. At the subsequent step S2, pre-reading of signal is carried out so as to permit a smooth gain control function to be constructed in the state matching with adjacent blocks. At the subsequent step gain control function $g_j(n)$ from an input waveform signal is calculated to carry out calculations of the formulas (13) and (2) in order recited at step S4 to thereby transform the waveform signal into spectrum signals. At the subsequent step S5, normalization and quantization of the spectrum signals obtained are carried out. At step S6, the normalized and quantized spectrum signals and gain control function generation information are encoded. At the step S7, the block No. J is incremented. At step S8, whether or not processing is completed is discriminated. When the discriminated result is NO, the processing operation returns to the step S2. When the discriminated result is YES, processing is completed.

In the example of the decoding method of FIG. 5, at the first step S11, block No. J is set to zero. At the subsequent step S12, normalized and quantized spectrum signal and gain control function generation information are decoded. At the subsequent step S13, inverse normalization/inverse quantization of the spectrum signal thus obtained is carried out. At step 14, calculation of the gain control function based on the gain control function generation information is carried out. Thereafter, at step S15, calculations of the above-mentioned formulas (3), (4), (9) and (10) are carried out in order recited to thereby the spectrum signal into waveform element. At step S16, signal y(n+JM) thus obtained is outputted. At step S17, the block No. J is incremented. At step S18, whether or not processing operation is completed is discriminated. When the discriminated result is No, the processing operation returns to the step S12. When the discriminated result is YES, the processing is completed.

Figure 6:
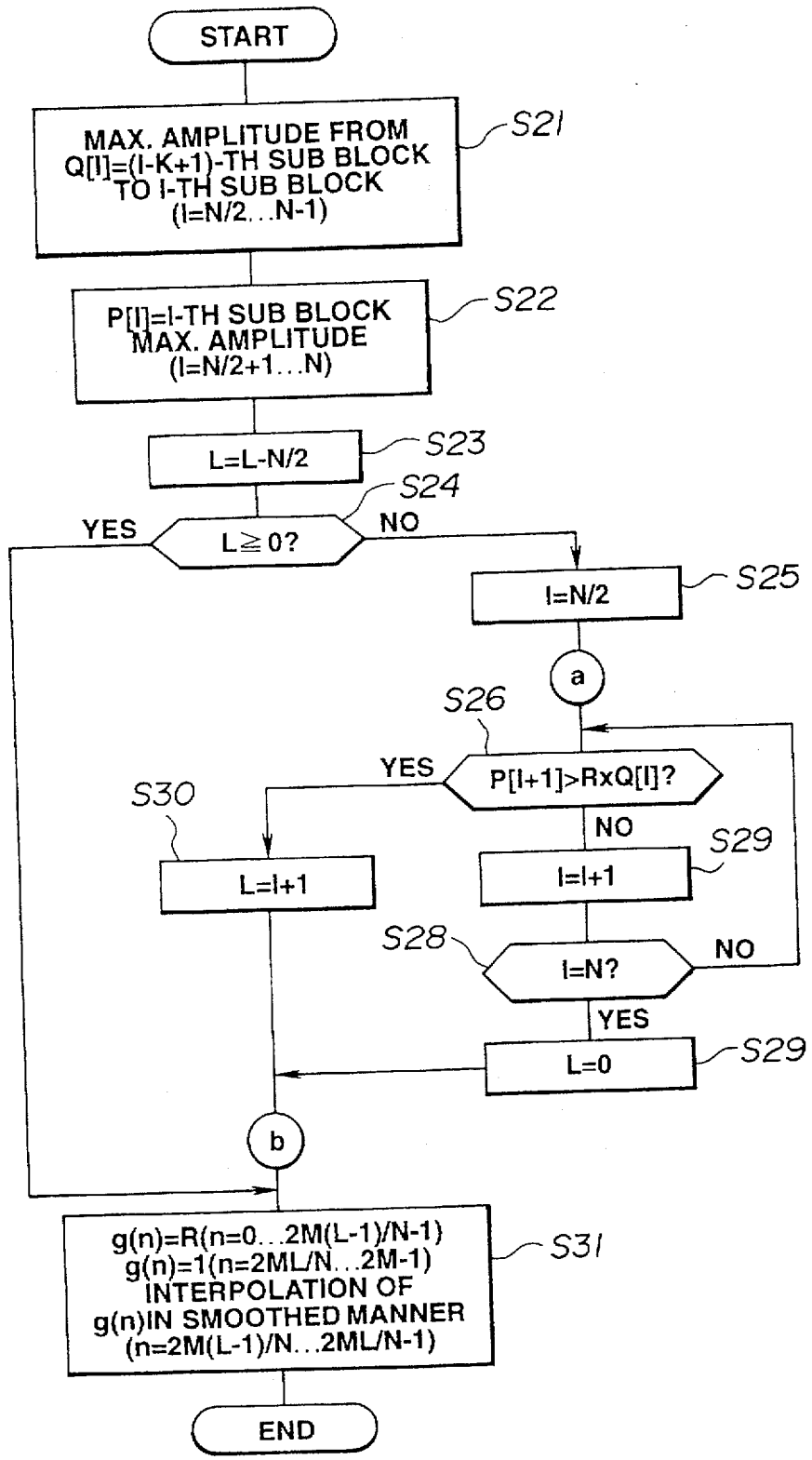
FIG. 6 is a flowchart for explaining an example of a gain control function generation in the encoding method of the embodiment of this invention.

FIG. 6 is a flowchart showing processing procedure of calculation of the gain control function $g_j(n)$ at the step S3 in the FIG. 4 mentioned above.

In FIG. 6, a block of length 2M having portions overlapping with blocks adjoining in both directions respectively by halves is divided into N number of sub blocks to compare maximum amplitude value P[I] in the (I+1)-th sub block with maximum amplitude value Q[I] in K number of successive sub blocks up to the I-th sub block to judge that the attack portion has been detected in the case where a ratio therebetween is a predetermined value or more. It is to be noted that, in order to satisfy the above-described condition required so that waveform signals are synthesized without inconsistency at the time of decoding, it is necessary to hold matching of gain control function between a current (corresponding) block and a block forward in point of time in which processing of gain control was already carried out. In the case of this example, the number of attack portions within one block is one at most. In the case where the attack portion has been already detected at the first half portion of a current block in the processing of the block forward in point of time, which overlaps therewith, detection of the attack portion is no longer detected. If otherwise, detecting processing of the attack portion is carried out at the latter half portion of block. Accordingly, it can be said that the above-described matching holds. In addition, a gain control function having a smooth transient portion is ultimately constituted thus to prevent diffusion (dispersion) of energy in the case where waveform signal is transformed into spectrum signals.

Namely, at the first step S21 of FIG. 6, maximum amplitude value Q[I] of successive K number of sub blocks up to the I-th sub blocks of N number of sub blocks obtained by dividing one block, i.e., from the (I-K+1)-th sub block to the I-th sub block is determined. At step S22, maximum amplitude value P[I] in the I-th sub block is determined. At the subsequent step S23, N/2 is subtracted from the attack position L in the block forward in point of time to convert L into sub block No. in a current block. At the subsequent step S24, whether or not L is O or more is discriminated. When the discriminated result is YES, it is judged that the attack portion existed at the latter half portion of the forward block. The processing operation proceeds to step S31 to transfer (shift) the gain control function of the latter half portion of the forward block to the first half portion of a current block. When the discriminated result is No, it is judged that no attack portion existed at the latter half portion of the forward block. The processing operation proceeds to step S25 to carry out detecting processing as to whether or not the attack portion exists at the latter half portion of the current block.

At the step S25, in order to examine sub blocks of the latter half portion of the current block, I is replaced by N/2. At the subsequent step S26, whether or not the maximum amplitude value P[I+1] in the (I+1)-th sub block is greater than value obtained by multiplying the maximum amplitude value Q[I] up to the I-th sub block by a predetermined gain R which is considered to be attack portion, i.e., R×Q[I] is discriminated. When the discriminated result is No, I is incremented at step S27. At step S28, whether or not I reaches the sub block No. of the block terminating end is discriminated to repeat processing of the step S26 until I becomes equal to N. When the discriminated result is YES at the step S28, L is set to O, i.e., it is judged that there is no attack portion at step S29. The processing operation proceeds to step S31. When the discriminated result is YES at the step S26, the attack portion is found out, the processing operation proceeds to step S30 to set L to L=I+1. Then, the processing operation proceeds to step S31.

At the step S31, gain control functions of sub blocks up to the attack position L are caused to be R and the remaining gain control functions are caused to be 1 to carry out interpolation processing so as to ultimately have smooth transient portion. Thereafter, the processing is completed.

Of course, as a method of constituting a gain control function, various methods may be employed in addition to the above. For example, plural attack portions may be assumed to be detected within one block to constitute a gain control function FIGS. 8 and 9 respectively show examples of the configurations of an encoding apparatus (unit) and a decoding apparatus (unit) in the case where this invention is applied thereto.

Figure 8:
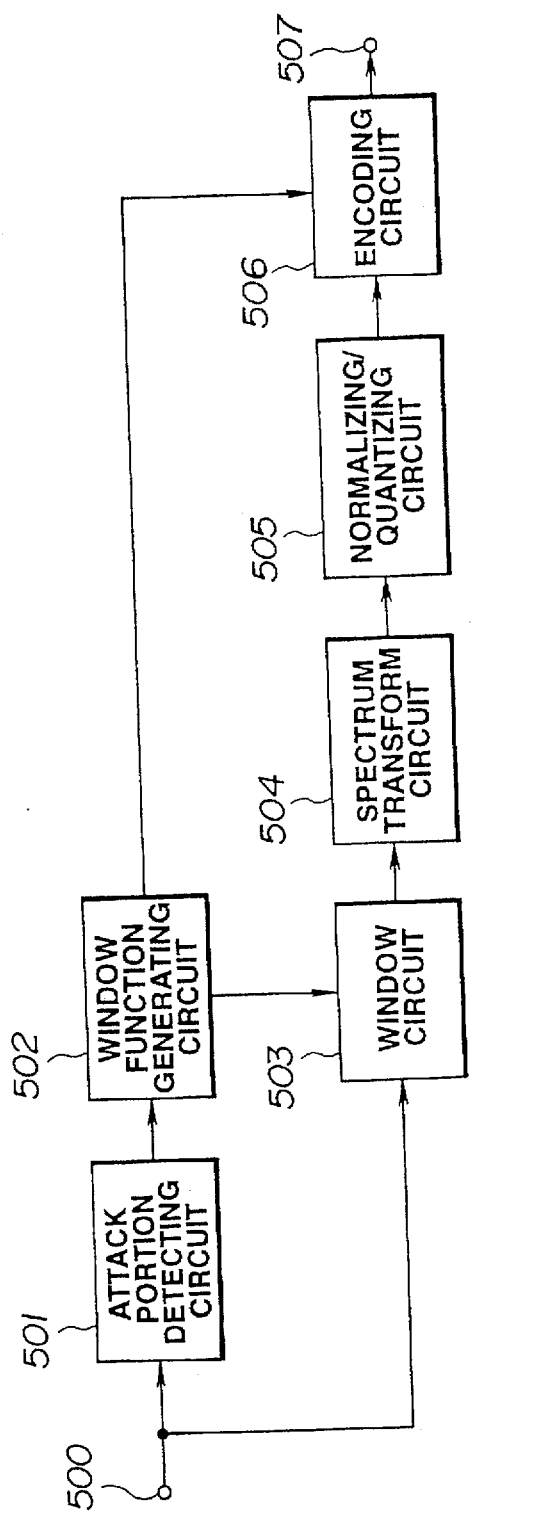
FIG. 8 is a block diagram showing an example of the configuration of an encoding apparatus to which the encoding method of the embodiment of this invention is applied.

In FIG. 8, $[w_1(n)g_j(n)]$ of the above-mentioned formula (13) is assumed to be collectively window function. A window function generating circuit 502 constitutes a window function on the basis of gain control function generation information outputted from an attack portion detecting circuit 501. This gain control function generation function is encoded along with normalized and quantized spectrum signal, and is sent to decoding unit of FIG. 9.

Namely, input terminal 500 of FIG. 8 is supplied with a waveform signal as shown in (A) of FIG. 3, for example. A window circuit 503 sets time windows sequentially successive in point of time and overlapping with each other to multiply the waveform signal by window function so as to extract the waveform signal by the time windows. The attack portion detecting circuit 501 detects the portion (attack portion) where amplitude of an input signal suddenly becomes great. The window function generating circuit 502 generates window function on the basis of gain control function generation information outputted from the attack portion detecting circuit 501 to send it to the window circuit 503, and to amplify a waveform signal of small amplitude immediately before the attack portion so that it is multiplied by R thereafter to send it to a spectrum transform circuit 504. At the spectrum transform circuit 504, the waveform signal is transformed into spectrum signal by MDCT. At a normalizing/quantizing circuit 505, the spectrum signal is normalized and quantized. Thereafter, the signal thus processed is encoded by an encoding circuit 506. Thus, the encoded signal thus obtained is taken out as a code train signal from output terminal 507. This code train signal is recorded and reproduced as occasion demands, or is subjected to transmission through a transmission medium. Thereafter, such code train signal is sent to input terminal 510 of the decoding unit of FIG. 9.

Figure 9:
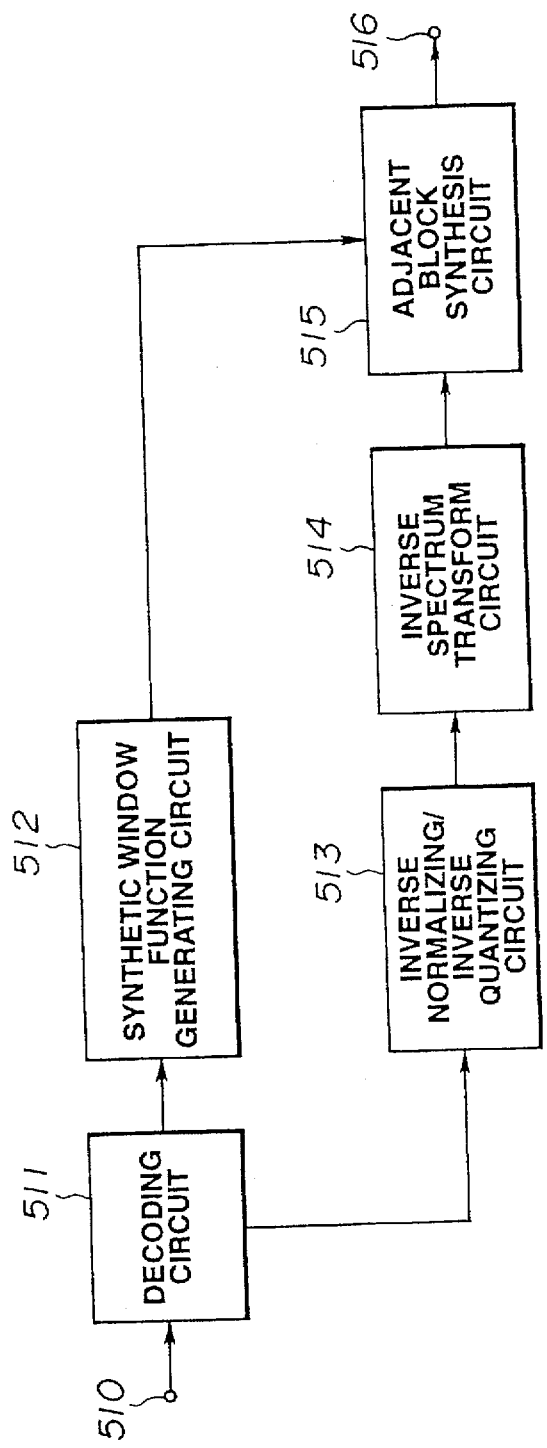
FIG. 9 is a block diagram showing an example of the configuration of a decoding apparatus to which the decoding method of the embodiment of this invention is applied.

In the decoding unit shown in FIG. 9, $w_2(n)$ of the above-mentioned formula (4) and $[w_2(n)/g_j(n)]$ determined from $g_j(n)$ of the above-mentioned formula (9) are combined into synthetic window function. A synthetic window function generating circuit 512 constitutes the synthetic window function on the basis of gain control function generation information sent from a decoding circuit 511 to send it to an adjacent block synthesis circuit 515. An inverse spectrum transform circuit 514 carries out processing of the formula (3), and the adjacent block synthesis circuit 515 collectively carries out processing corresponding to the above-mentioned formulas (4), (9), (10).

Namely, decoding opposite to encoding at the encoding circuit 506 is implemented at the decoding circuit 511 to the code train signal delivered to the input terminal 510 of FIG. 9, and the decoded signal thus obtained is sent to an inverse normalizing/inverse quantizing circuit 513. An output from the inverse normalizing/inverse quantizing circuit 513 is inversely transformed into a signal in the time region by IMDCT at an inverse spectrum transform circuit 514, and is then sent to the adjacent block synthesis circuit 515, at which synthesis with the adjacent block is carried out. In this synthesis, the signal in the time region is multiplied by synthetic window function from the synthetic window function generating circuit 512. The synthesized signal thus obtained is taken out through output terminal 516.

As stated above, the method or apparatus of this invention can be also applied to an apparatus for processing a digital signal obtained by converting an acoustic waveform signal, and can be also applied in the case where a waveform signal once filed is processed by computer. Moreover, it is of course possible to record a code train signal thus obtained onto a recording medium, and/or to carry out transmission of such a code train signal. In addition, this invention can be applied in the case where encoding is carried out at a fixed bit rate at all times, and also in the case where encoding is carried out at a bit rate changing in point of time so that the numbers of allocated bits change every block.

While explanation has been given in connection with the case where a digitized waveform signal is transformed into spectrum signals directly using spectrum transform processing at the encoding unit, it is a matter of course that this invention can be applied also in the case where a waveform signal is transformed into spectrum signals by using spectrum transform processing every bands once divided by using band division filter.

Figure 10:
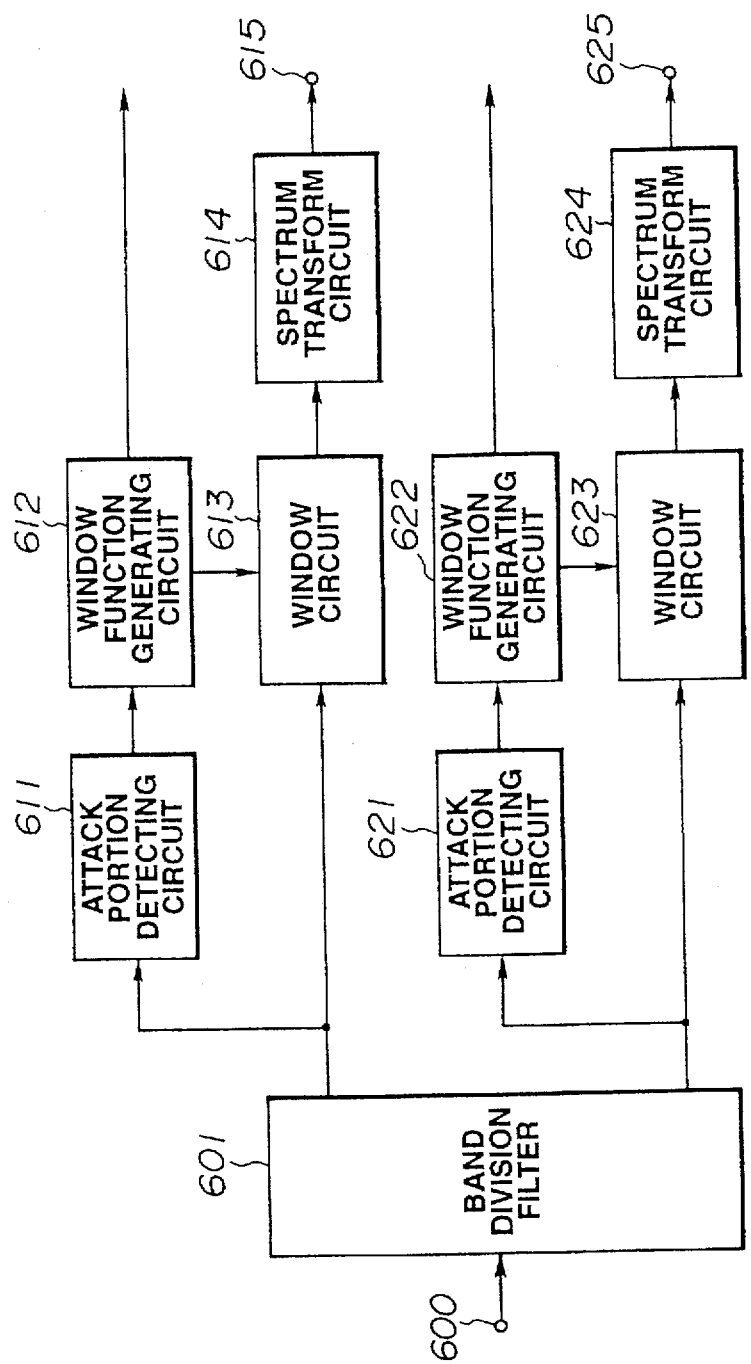
FIG. 10 is a block diagram showing another example of a spectrum signal generating section of the encoding apparatus of the embodiment of this invention.
Figure 11:
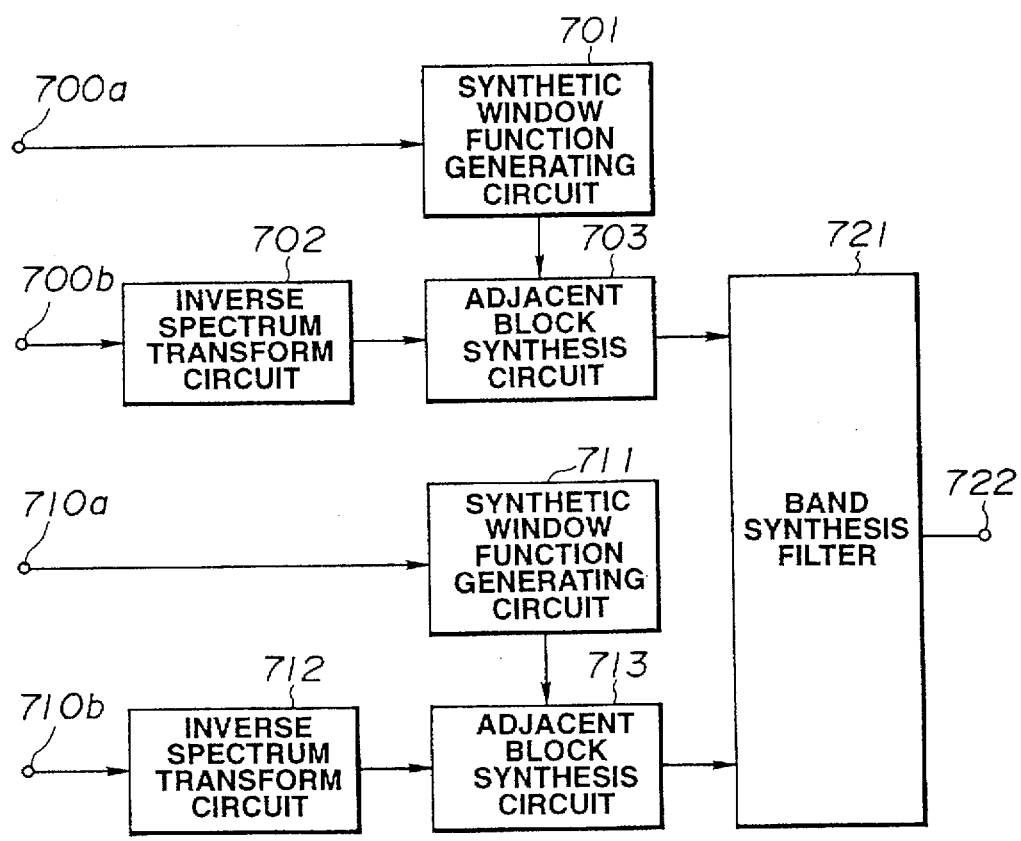
FIG. 11 is a block diagram showing another example of a time series signal generating section of the decoding apparatus of the embodiment of this invention.

FIGS. 10 and 11 are block diagrams respectively showing the configurations of the section for carrying out transform processing of signal in the encoding apparatus (unit) and the decoding apparatus (unit) in such a case. "Spectrum transform processing for allowing waveform elements to interfere with each other between adjacent blocks at the time of inverse transform processing" in this invention also includes the case where band division filter is used thereafter to carry out spectrum transform processing in this way.

Namely, in the encoding unit shown in FIG. 10, an audio signal inputted to the encoding unit through input terminal 600 is caused to undergo band division by a band division circuit 601. A portion of the signal which has been caused to undergo band division by the band division circuit 601 is sent to an attack portion detecting circuit 611 and a window circuit 613, and the other portion is sent to an attack portion detecting circuit 621 and a window circuit 623. At the window circuits 613, 623, time windows sequentially successive in point of time and overlapping with each other are set, and a waveform signal is multiplied by window function so as to extract the waveform signal by these time windows. The attack portion detecting circuits 611, 621 detect the portion (attack portion) where amplitude of an input signal becomes great. Window function generating circuits 612, 622 generate window functions on the basis of gain control function generation information respectively outputted from the attack portion detecting circuits 611, 621 to respectively send them to window circuits 619, 623 to amplify waveform signals of small amplitude immediately before the attack portion so that they are multiplied by R to send them to the spectrum transform circuits 614, 624. At the spectrum transform circuits 614, 624, waveform signals are transformed into spectrum signals by MDCT. The spectrum signals thus obtained are respectively taken out from output terminals 615, 625. Thereafter, spectrum information which are spectrum signals from respective output terminals 615, 625 and information from respective window function generating circuits 612, 622 are encoded. The encoded signals thus obtained are recorded and reproduced, or are transmitted through a recording medium on a transmission medium, and are sent to decoding unit.

Moreover, in the decoding unit shown in FIG. 11, respective input terminals 700b, 710b are supplied with spectrum signals corresponding to spectrum information from the respective output terminals 615, 625, and respective input terminals 700a, 710a are supplied with information from the respective window function generating circuits 612, 622. Spectrum signals from the respective input terminals 700b, 710b are caused to undergo inverse transform processing into a signal in the time region by IMDCT at inverse spectrum transform circuits 702, 712, and are then sent to adjacent block synthesis circuits 703, 713, at which respective synthesis operations with adjacent blocks are carried out. In this synthesis, signals in the time region are respectively multiplied by synthetic window functions from synthetic window function generating circuits 701, 711. Respective synthesized signals from adjacent block synthesis circuits 703, 713 are synthesized by a band synthesis filter 721 so that an audio signal is provided. The audio signal thus obtained is taken out from output terminal 722.

By implementing spectrum transform processing to signals which have been once subjected to band division as in the case of the configurations as shown in FIGS. 10, 11, it becomes possible to carry out a gain control with respect to a specific band, e.g., a band including large signal, or a band where signal changes to much degree. Thus, processing quantity for gain control can be lessened. In addition, since individual transform block lengths can be shortened, it becomes possible to carry out efficient transform processing by a small work area.

Figures 14A, 14B, 14C:
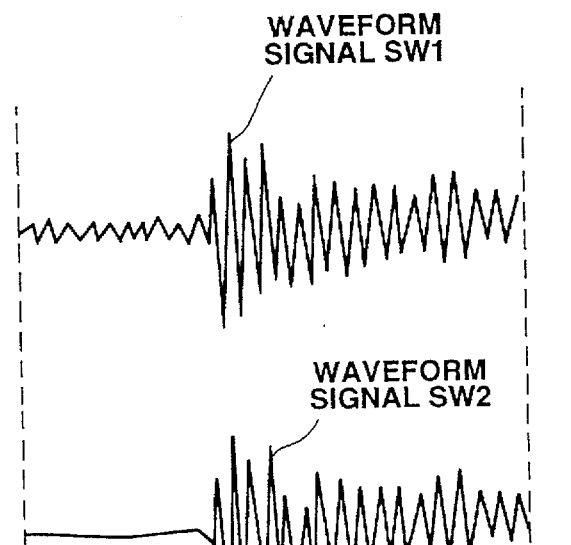
FIG. 14 is a view for explaining gain control operation at the time of windowing processing in another embodiment of this invention.

FIG. 14 is a view for explaining gain control operation at the time of windowing processing in the case where a second embodiment of this invention is applied.

In the previously described method described in the prior art, gain controlled variable for amplifying a signal portion immediately before the attack portion is fixed. For example, in the Japanese Patent Application Laid Open No. 7026/1988 publication, there is disclosed a method in which respective blocks are divided into sub blocks to amplify, by encoding means, amplitude of a signal before amplitude suddenly changes in the case where amplitude change between two sub blocks is above a predetermined limit value (about 20 dB) to correct it by decoding means.

However, while, for example, waveform signals SW1, SW2 of (A) of FIG. 14 both include attack portion, there is great difference between ways of changes of amplitude. Namely, in the waveform signal SW1, a waveform signal of a predetermined level or more exists also immediately before the attack portion, and pre-echo produced is masked to some extent by the original waveform signal although the degree of masking is smaller than that after the attack portion. On the contrary, in the waveform signal SW2, level of a waveform signal immediately before the attack portion is very low, and pre-echo produced is hardly masked.

Here, in the case where attempt is made to discriminate detection of the attack portion only by one limit value of level change to carry out the same gain control/gain control correction, when limit value and controlled variable are set so that they are optimum with respect to the waveform signal SW1, pre-echo would be heard with respect to the waveform signal SW2. Moreover, when limit value and gain controlled variable are set so that they are optimum with respect to waveform signal SW2, gain control more than required would be conducted with respect to the waveform signal SW1. As a result, since diffusion (dispersion) of energy results in the frequency region, encoding efficiency would be lowered.

In view of the above, the method of this invention employs an approach to change gain controlled variable in dependency upon the degree of amplitude change at the attack portion of a waveform signal to thereby solve this problem.

Namely, in the method of this invention, as shown in (A) of FIG. 14, gain control function G1 of a relatively small gain controlled variable shown in (B) of FIG. 14 is applied to the waveform signal SW1 to carry out processing of gain control and gain control correction, whereas gain control function G2 of a relatively large gain controlled variable is applied to the waveform signal SW2 to carry out processing of gain control and gain control correction.

(C) of FIG. 14 shows respective manners in which quantizing noises are generated in the case where such processing is carried out. As shown in (C) of FIG. 14, quantizing noise before the attach portion of quantizing noises of the waveform signal SW1 is great as compared to quantizing noise before the attack portion of quantizing noises of the waveform signal SW2 because noise suppressing action (effect) by the gain control correcting processing is relatively small. However, energy of quantizing noise as a whole becomes smaller. On the contrary, energy of quantizing noise as a whole with respect to the waveform signal SW2 is relatively great, but quantizing noise before the attack portion is sufficiently held down to small level. Since pre-echo is big hindrance from a viewpoint of the hearing sense, it is desirable to suppress, in this way, the entire noise energy prior to locally (or partially) lowering thereof.

Figure 15:
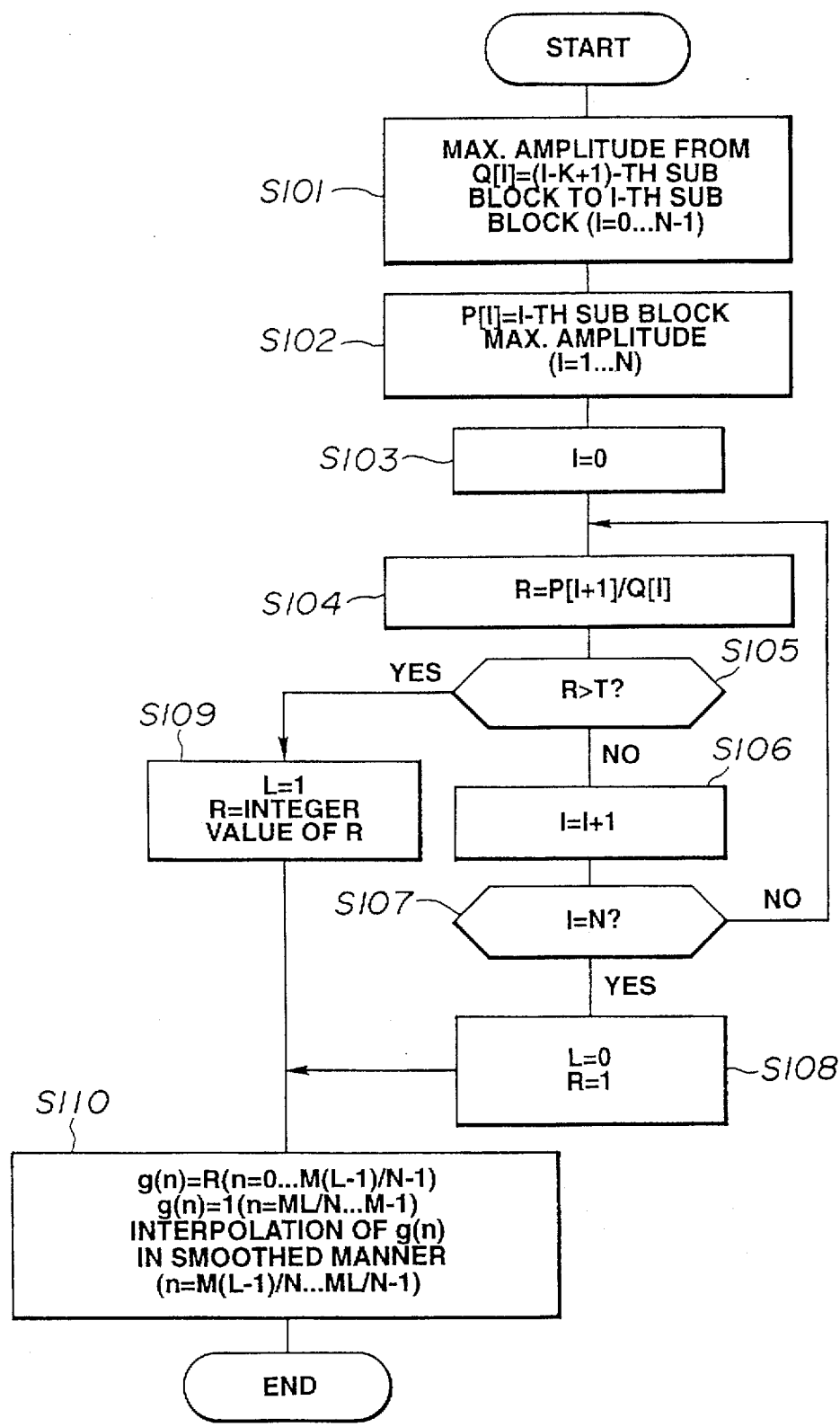
FIG. 15 is a flowchart showing, in a more practical manner, an example of processing procedure of gain control function generation in an encoding method of a further embodiment of this invention.

FIG. 15 shows an example of flow of the processing for detecting the attack portion to generate a gain control function in the case where a method of this invention is actually applied to encoding of signal. For example, this processing is incorporated into the attack portion detecting circuit 501 of the encoding unit of the FIG. 8 mentioned above or the attack portion detecting circuits 611, 621 of the FIG. 10 mentioned above, thereby making it possible to realize the encoding method of this invention.

In FIG. 15, a block of, e.g., length 2M is divided into N number of sub blocks to compare the maximum amplitude value P[I] in the I-th sub-block with the maximum amplitude value Q[I] in successive K sub blocks up to the I-th sub block to judge that the attack portion has been detected in the case where a ratio therebetween is a predetermined value or more. In addition, a gain control function ultimately having a smooth transient portion is constituted thus to prevent diffusion (dispersion) of energy in the case where a waveform signal is transformed into spectrum signals.

Namely, at the first step S101 of FIG. 15, maximum amplitude value Q[I] the successive K number of sub blocks up to the I-th sub block of N number of sub blocks obtained by dividing one block, i.e., from (I-K+1)-th sub block to the I-th sub block is determined. At step S102, maximum amplitude value P[I] in the I-th sub block is determined. At the subsequent step S103, I is set to 0 (zero). At step S104, R as the gain controlled variable is determined by ratio of maximum amplitude Q[I] of K number of sub blocks up to the I-th sub block to the maximum amplitude P [I+1] of sub blocks immediately thereafter. T of the subsequent step S105 is a predetermined threshold value. In the case where the R is greater than T, it is judged that the attack portion has been detected. Thus, the processing operation proceeds to step S109. When the judgment result is No, the processing operation proceeds to step S106 to increment I. At step S107, whether or not I reaches the sub block No. N of the block terminating end is discriminated. Processing of step S104 and those subsequent thereto are repeated until I becomes equal to N. When the discriminated result is YES at the step S107, L is set to zero, i.e., it is judged that there is no attack portion to set R to R=1. The processing operation proceeds to step S110. When the discriminated result is YES at the step S105, i.e., the attack portion has been found, the processing operation proceeds to step S109 to set L to L=I+1 to substitute integer value of value of R determined at the step S104 for R. Namely, length before the attack portion in this block is interpreted as L number of sub blocks. Value of R at this time indicates gain controlled variable. After processing of step S109 is completed, the processing operation proceeds to step S110.

At the step S110, gain controlled variables of sub blocks up to the attack position L is set to R and the remaining ones are set to 1, and interpolation processing is carried out so as to ultimately have smooth transient portion. Thereafter, processing is completed. Namely, at this step S110, gain control function g(n) is constituted on the basis of values of L and R. At sub-block immediately before the attack portion, interpolation is carried out so that gain control function value becomes smooth. This is because such an interpolation prevents diffusion (dispersion) of energy distribution in the case where a signal in the time region is transformed into a signal in the frequency region, thus permitting efficient encoding.

As stated above, by changing gain controlled variable of the attack portion in dependency upon level of the waveform signal, pre-echo can be advantageously effectively prevented also in the case where compression rate is high.

Figure 16:
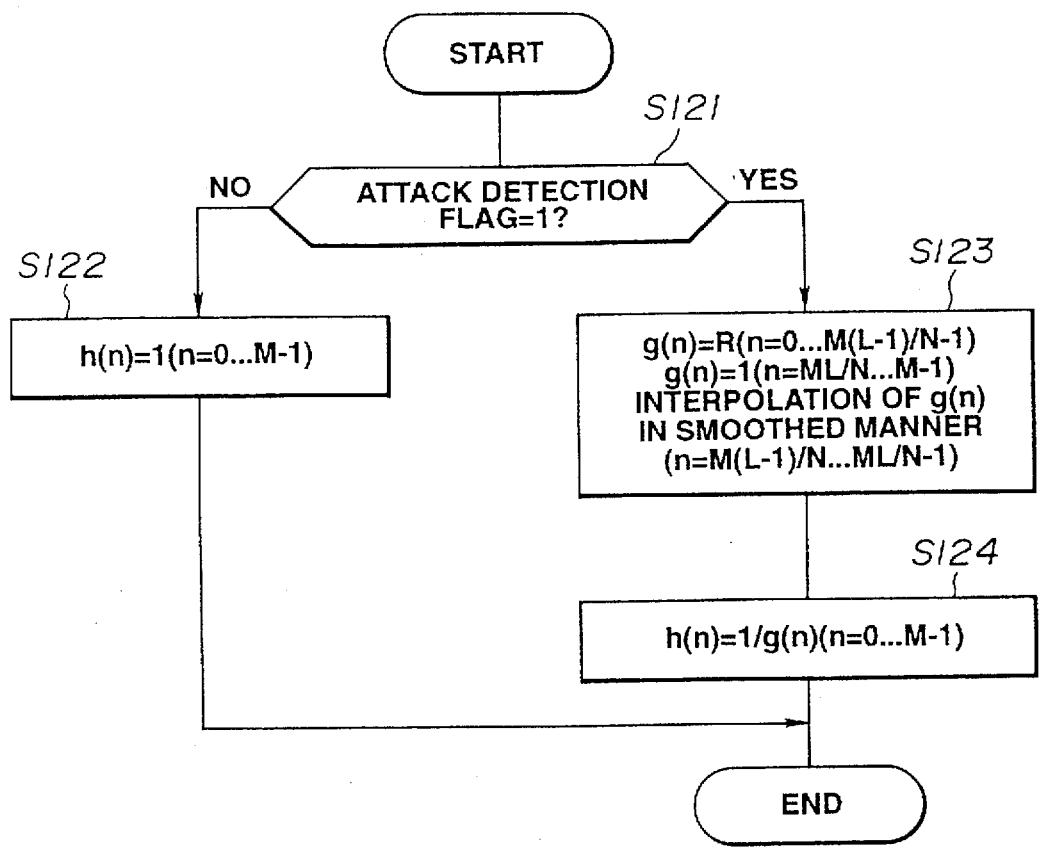
FIG. 16 is a flowchart showing outline of an example of a portion of processing procedure of a decoding method of a further embodiment of this invention.
Figure 17A:
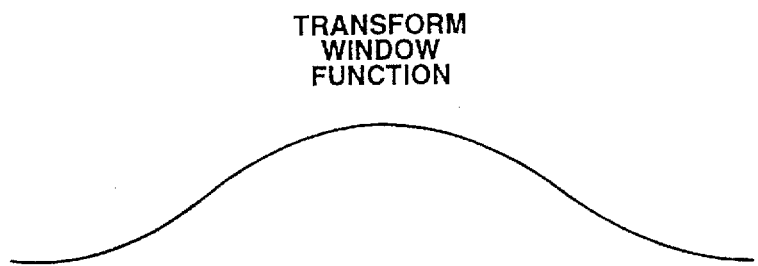
FIG. 17 is a view for explaining the principle of the operation of pre-echo generation in the transform encoding.
Figure 17B:
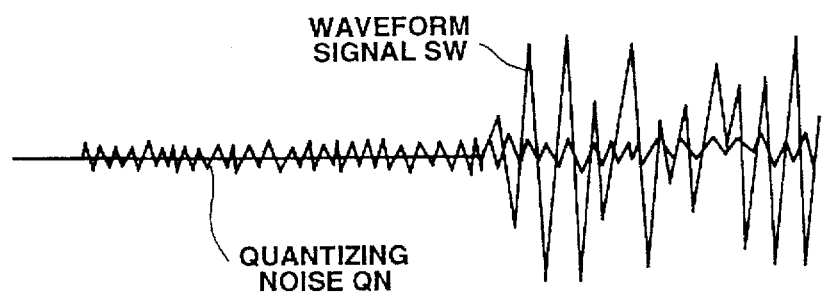

FIG. 16 shows an example of processing for generating gain control correction function h(n) in decoding.

Figure 18A:
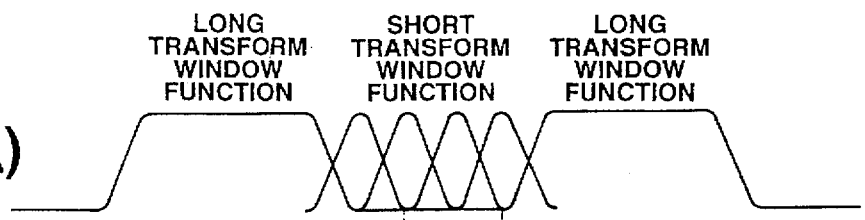
FIG. 18 is a view for explaining the principle of the operation of the conventional transform window length changeable encoding/decoding technology.
Figure 18B:
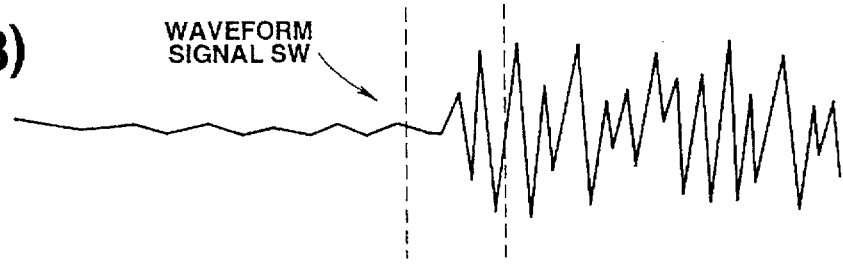
Figure 19A:
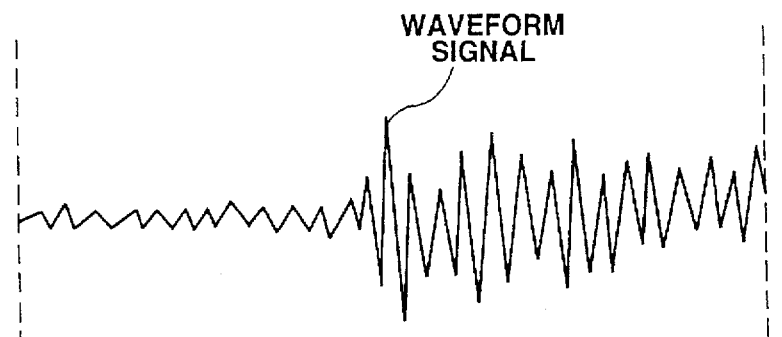
FIG. 19 is a view for explaining the principle of the operation of encoding/decoding using the conventional technology in which adaptive gain control is carried out with respect to an input signal.
Figure 19B:
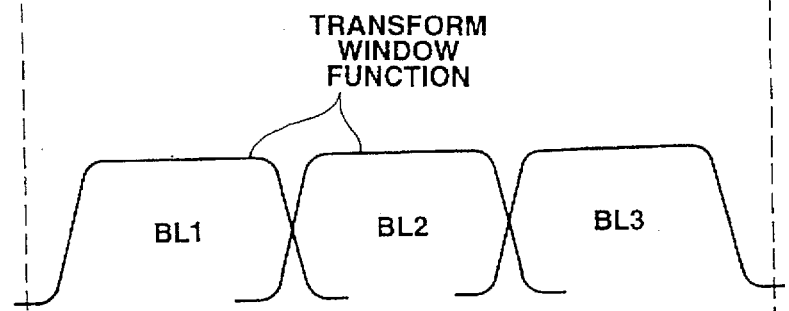
Figure 19C:
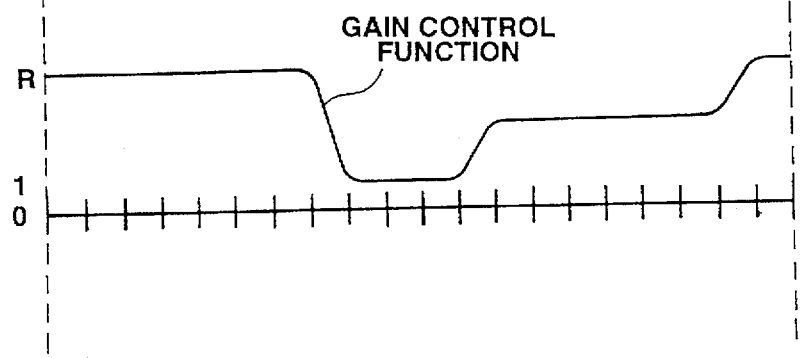
Figure 20:
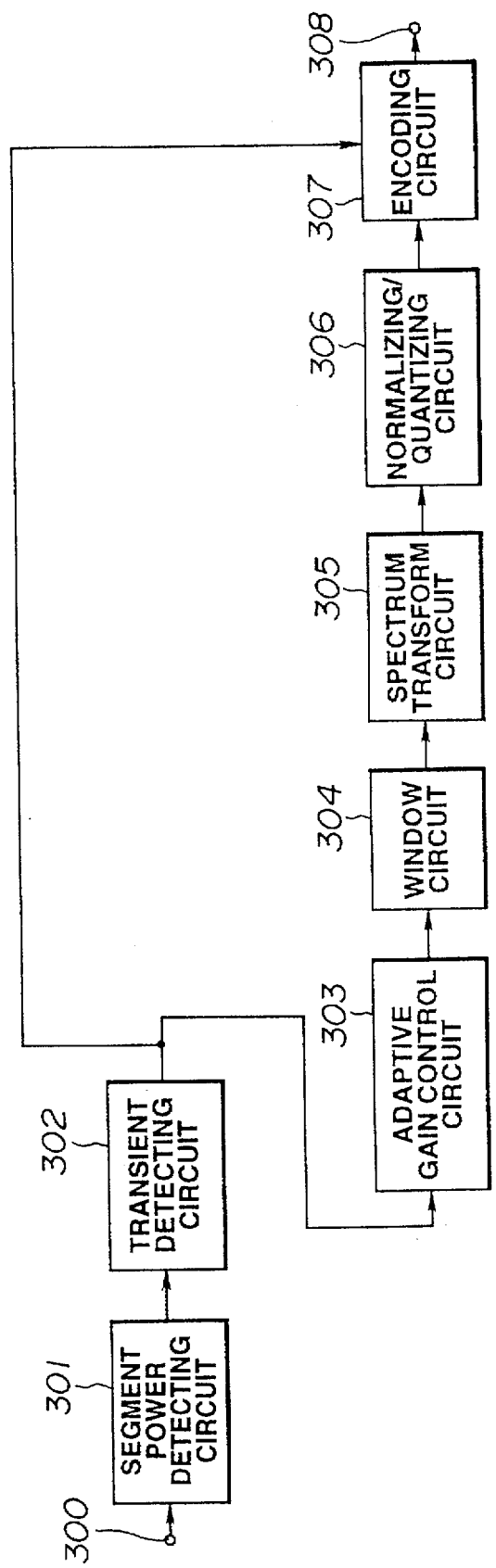
FIG. 20 is a block diagram showing outline of the configuration of a conventional encoding apparatus by the adaptive gain control technology.
Figure 21:
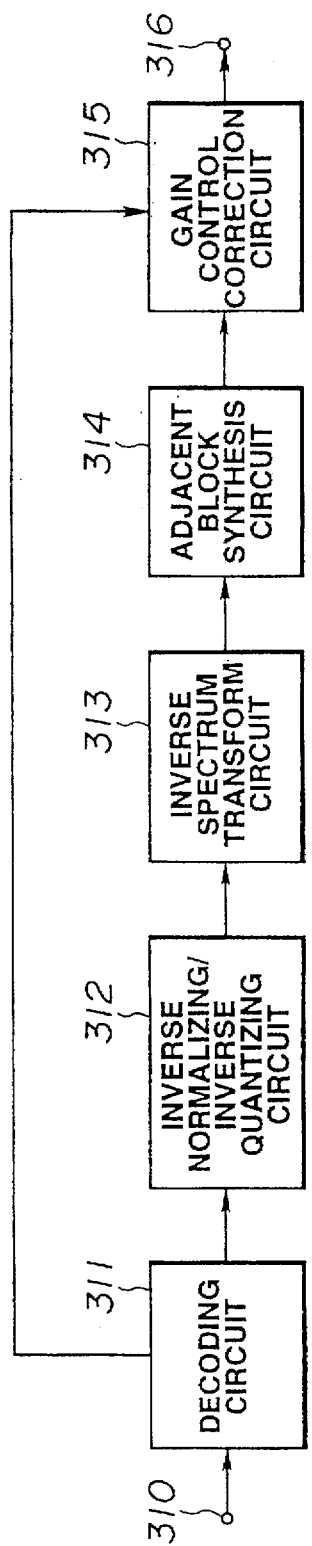
FIG. 21 is a block diagram showing outline of the configuration of a conventional decoding apparatus by the adaptive gain control technology.
Figure 23:
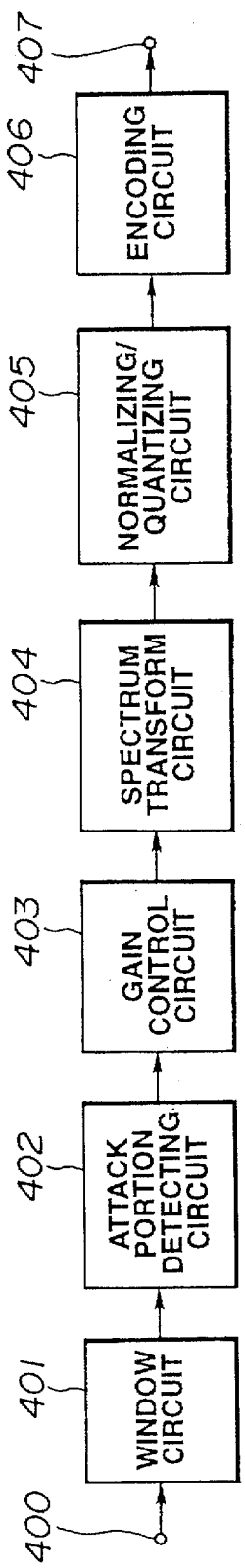
FIG. 23 is a block diagram showing outline of the configuration of a conventional encoding apparatus by the windowing processing technology.
Figure 24:
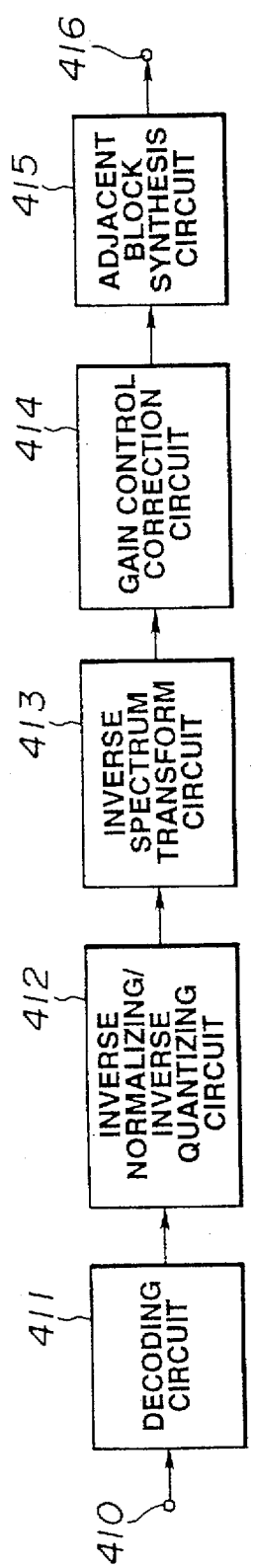
FIG. 24 is a block diagram showing outline of the configuration of a conventional decoding apparatus by the windowing processing technology.

For example, the processing shown in FIG. 18 is incorporated into synthetic window function generating circuit 512 of the decoding unit of the FIG. 9 mentioned above or synthetic window function generating circuits 701, 711 of FIG. 11 to multiply waveform elements composed by the inverse spectrum transform circuit 514 of FIG. 9 or inverse spectrum transform circuits 702, 712 of FIG. 11 by the generated gain control correction function h(n), thereby making it possible to realize the decoding method according to this invention. Of course, in blocks where no attack portion is detected, processing for actually carrying out multiplication of gain control correction function h(n) may be omitted.

In the example of FIG. 16, at step S121, attack portion detection flag is detected. When flag is 0, i.e., no attack portion is detected, the processing operation proceeds to step S122 to set gain control correction function h(n) to 1 to complete processing. When flag is 1, i.e., the attack portion is detected, the processing operation proceeds to step S123 to set gain control function g(n) corresponding to L number of sub blocks from the leading portion of this block to R to carry out the interpolation processing to determine final gain control function g(n). At the subsequent step S124, inverse number 1/g(n) of the gain control function g(n) is calculated to determine gain control correction function h(n).

In addition, while gain controlled variable R of the attack portion is one kind in the above-described first embodiment, such gain controlled variable may be varied in dependency upon level of a waveform signal by applying the second embodiment.

Figure 7:
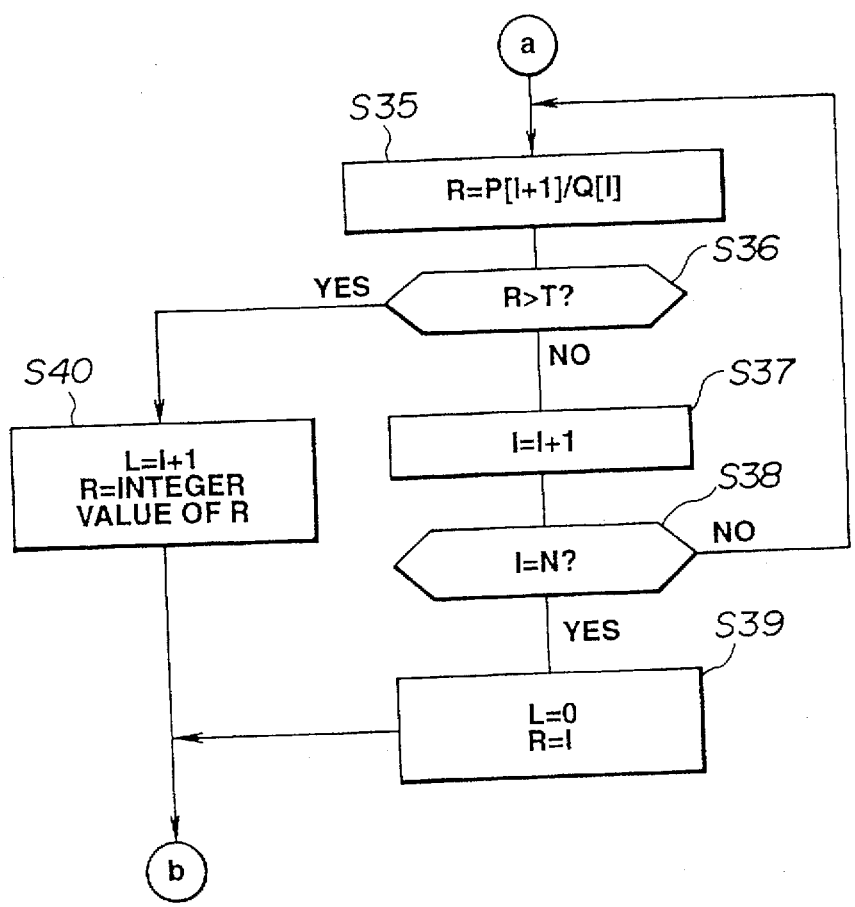
FIG. 7 is a flowchart showing the another example of ion of another example of gain control function generation in the encoding method of the embodiment of this invention.

FIG. 7 is a view for explaining the principle of the operation in the case where gain controlled variable of the attack portion is changed, and shows a portion of the flowchart which can be replaced by the processing steps indicated by a to b of the flowchart of the FIG. 6 mentioned above. The processing operation proceeds from the step S25 of FIG. 6 to step S35 of FIG. 7, and proceeds from step S39 or step S40 of FIG. 7 to the step S31 of FIG. 6.

At step S35 of this FIG. 7, R is determined by ratio of the maximum amplitude Q[I] of K number of sub blocks up to the I-th sub block to the maximum amplitude P[I+1] of sub block immediately thereafter. T of the subsequent step S36 is a predetermined threshold value. In the case where the above-mentioned R is greater than T, it is judged that the attack portion has been detected. The processing operation proceeds to step S40. When the judgment result is NO, the processing operation proceeds to step S37 to increment I. At step S38, whether or not I reaches the sub block No. N of the block terminating end is discriminated to repeat processing of step S35 and those subsequent thereto until I becomes equal to N. when discriminated result is YES at step S38, L is set to 0 (zero), it is judged that there is no attack portion to set R to 1. Then, the processing operation proceeds to the step S31 of the FIG. 6 mentioned above through b. When the discriminated result is YES at the step S36, i.e., the attack portion has been found out, the processing operation proceeds to step S40 to set L to L=I+1 to substitute integer value of R determined at the step S35 for R. Then, the processing operation proceeds to the step While, in these examples, the gain control is conducted so that signal is amplified only immediately before the attack portion, this is particularly based on the forward masking effect as previously described. It is a matter of course that gain control may be conducted so that signal is amplified at small amplitude portion at the time of attenuation. For example, in such cases that block length of spectrum transform processing is extremely long, so the forward masking effect cannot be sufficiently expected, signal may be amplified at small amplitude portion at the time of attenuation. In addition, it is not necessarily required that the number of attack portions to be detected is 1 (one) with respect to a single block.

When a function suddenly changing in a step form is used as the gain control function, its energy is dispersed (diffused) in the case where waveform signal is transformed into spectrum signal, so efficiency of encoding is lowered. For this reason, it is desirable that the gain control function has a shape smoothly changing to some extent also at the attack portion. In this case, since pre-echo would be heard unless that time period is sufficiently short, it is desirable that the gain control function has a transient time period of about 1 ms in consideration of the hearing sense of the human being so that it is caused to be smoothly changed like, e.g., sine wave form within that time period. In preparation for the case where the attack portion takes place at the leading portion of the next block, an approach may be employed to expand the detection range of the attack portion up to the leading sub block of the next block to thereby allow the gain control function to have a smooth transient portion.

Figure 12:
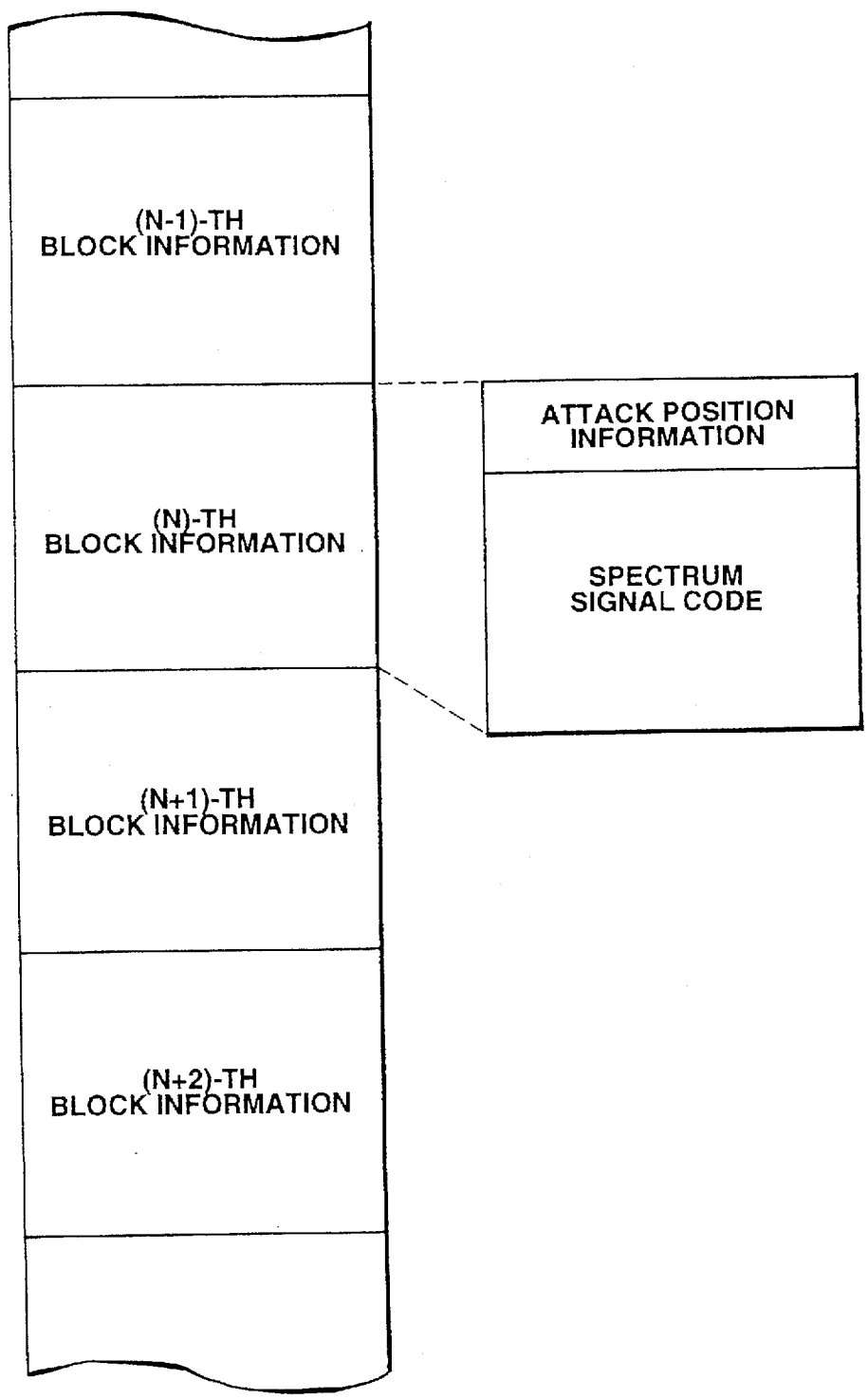
FIG. 12 is a view showing the recording state of a code train obtained by encoding of the embodiment of this invention.

FIG. 12 shows an example of a method of recording information encoded by the method of the first embodiment onto a recording medium and recording form or recording format.

In the example shown in FIG. 12, code of each block consists of attack position information and code of spectrum signal. The attack position information is gain control function generation information. The decoding unit generates gain control function on the basis of the attack position information, thereby making it possible to generate synthetic window function. As the attack position information, value of L of FIG. 6 may be recorded. Moreover, as another example of a recording form of the attack position information, an approach may be employed to represent presence or absence of the attack portion by flag to record the above-described value of L only in a block where the attack portion exists. Since ratio of blocks where the attack portion exists that pre-echo becomes problem in actual musical signals is low, efficient encoding can be made by employing such an approach. Moreover, an approach may be employed to record attack position information of a corresponding one of respective blocks so that the decoding unit can use attack position information immediately before the corresponding block with respect to the first half portion. By employing such an approach, it is possible to efficiently record well-matched gain control function generation information.

Figure 13:
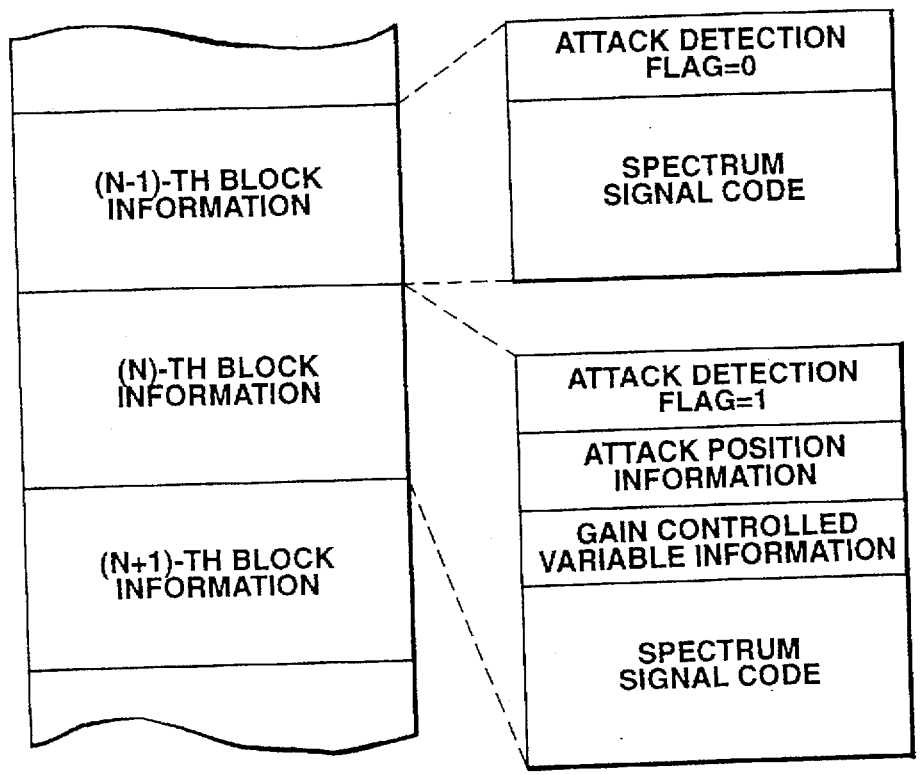
FIG. 13 is a view showing another recording state of a code train obtained by encoding of the embodiment of this invention.

FIG. 13 is a view showing an example of recording format in the case where signal is encoded by the method of the second embodiment, or in the case where there is used the gain controlled variable changing technique shown in the FIG. 7 mentioned above with respect to the first embodiment.

In the example shown in FIG. 13, code of each block consists of an attack portion detection flag and a spectrum signal code, and further includes, in addition to the above, gain control correction function generation information consisting of attack portion position information and gain controlled variable information in dependency upon the content of the attack portion detection flag. As the attack position information, value of L of FIG. 15 or 7 may be recorded. As the gain controlled variable information, value of R of FIG. 15 or 7 may be recorded. Other portions are similar to those of the example of FIG. 12. It is to be noted that gain control correction function generation information may be of course recorded in all blocks. In this case, recording may be carried out, in the state where L=0 and R=1, in blocks where no attack portion actually exists.

Explanation has been given in connection with the case where MDCT, i.e., Modified Discrete Cosine Transform is used as spectrum transform processing to allow waveform elements to interfere with each other between adjacent blocks at the time of inverse transform processing. While employment of MDCT is convenient in that it is possible to easily realize spectrum transform processing calculated by the same formula with respect to all blocks, this invention can be also applied in the case where another transforming method is adopted as spectrum transform processing to allow waveform elements to interfere with each other between adjacent blocks at the time of inverse transform processing. Such example of spectrum transform processing is described in the following literature: Analysis/Synthesis Filter Bank Design Based on Time Domain Aliasing Cancellation, J. P. Princen, A. B. Bradley, IEEE Transactions on Acoustics, Speech, and Signal Processing, Vol. ASSP-34, No. 5, October 1986. In this literature, there is disclosed such a transforming method in which transform/inverse transform processing of Cosine transform type is implemented in even numbered blocks, and transform/inverse transform processing of Sine transform type is implemented in odd numbered blocks, thus to allow waveform elements to interfere with each other between adjacent blocks at the time of inverse transform processing. Such transforming method may be used in this invention. It is to be noted that employment of a method of implementing the same transform/inverse transform processing in all blocks is preferable because the configuration of encoding means/decoding means can be simplified.

While explanation has been given in connection with the case where quantizing noises when acoustic waveform signals or audio signals are quantized are caused not to become conspicuous, this invention is effective in the case of allowing occurrence of quantizing noise of signals of other kinds not to become conspicuous, and may be applied also to, e.g., picture signals. However, since pre-echo at the attack portion in acoustic signals constitute great hindrance from a viewpoint of the hearing sense, application of this invention to acoustic signals is very effective. Moreover, it is a matter of course that this invention may be applied to acoustic signals of multi-channel type.

Further, this invention may be applied not only in the case where encoded information are recorded onto a disc shaped recording medium, but also in the case where such encoded information are recorded onto or into a recording medium such as a tape shaped recording medium or a semiconductor memory, etc. In addition, it is a matter of course that this invention may be applied also in the case were encoded information are subjected to transmission through a transmission path such as ISDN, etc.

As is apparent from the foregoing description, the information encoding method according to this invention carries out transform processing for allowing waveform elements to interfere with each other between adjacent blocks at the time of inverse transform processing, processing for carrying out gain control of an input waveform signal to the transform processing, output of the transform processing, and processing for encoding control information of the gain control, wherein the gain control processing is carried out so as to determine, in accordance with a gain control function of a forward block at the portion overlapping with the forward block of current block and the forward block, a gain control function of at least the overlapping portion of the current block. For this reason, if there is no loss by encoding in the case where inverse transform processing is carried out, it becomes correction so that correction so that the original waveform signal can be restored. Thus, pre-echo can be prevented by simple configuration by using transform processing of high encoding efficiency.

Moreover, the information decoding method according to this invention carries out processing for decoding spectrum signal on the frequency base and gain control correction information, inverse transform processing for allowing waveform elements to interfere with each other between adjacent blocks, and gain control correction processing of output waveform element of the inverse transform processing, wherein the gain control correction processing is carried out by making a correction so as to restore an original waveform signal on the basis of a gain control function of a current block determined in accordance with the gain control function of the forward block at the overlapping portion of the current block and the forward block. For this reason, pre-echo can be prevented in the state where any bad influence takes place in reproduction signals.

These effects/advantages similarly apply to the information encoding apparatus and the information decoding apparatus.

Moreover, gain control processing in encoding and corresponding correction processing in decoding are carried out without inconsistency between blocks. By using Modified Discrete Cosine Transform (MDCT) in the transform processing, block length can be set to a longer value without increasing independent spectrum components to be encoded. Moreover, the degree of local concentration of energies after spectrum transform processing is caused to be high. Thus, efficient encoding can be carried out, and pre-echo can be prevented by simple configuration. In addition, the configurations of the encoding apparatus and the decoding apparatus can be simplified.

Moreover, by carrying out gain control processing only with respect to waveform elements in which amplitude suddenly changes, it becomes unnecessary to carry out gain control at all times. Particularly, by carrying out gain control processing only with respect to waveform elements of which amplitude suddenly becomes great, gain controlled variable information can be simplified. Thus, processing quantity can be reduced and the configuration can be simplified. Namely, it is sufficient to solely carry out amplifying processing only with respect to the attack portion in each block. Thus, pre-echo can be prevented by simple processing.

Further, by using a controlled variable selectively determined from controlled variables of plural kinds of magnitudes as a gain controlled variable at the portion where a waveform signal suddenly becomes great, gain control corresponding to the degree of amplitude change of the attack portion can be made. Thus, encoding, decoding, recording and transmission which are more efficient and have high sound quality can be conducted.

Furthermore, by carrying out the gain control processing on the basis of gain control function having a smooth transient portion, lowering of encoding efficiency resulting from spreading of spectrum can be prevented.

Further, by carrying out spectrum transform processing with respect to band-divided signals (signal components), it becomes possible to carry out gain control only with respect to a band or bands including a large signal or a band or bands in which signal greatly changes. Thus, processing quantity for gain control can be reduced, and individual transform block lengths can be shortened. For this reason, it is possible to carry out efficient transform processing by smaller work area.

In addition, by recording signals encoded by such encoding method or apparatus onto or into a recording medium, or carrying out transmission of those encoded signals, efficient recording or transmission can be made.

What is claimed is:

1. An information encoding method for encoding an input waveform signal, the method comprising the steps of:
determining, on the basis of a gain control function of a block forward in point of time at an overlapping portion of a current block and the forward block, a gain control function of at least the overlapping portion of the current block;

controlling gain of a signal portion of the input waveform signal corresponding to the current block by using at least the determined gain control function of the overlapping portion;

extracting the gain-controlled signal portion so that a portion of sample of the adjacent block has the overlapping portion on the time base to transform it into a signal on the frequency base; and encoding the transformed signal and control information for the gain control.

2. An information encoding method as set forth in claim 1, wherein the transform processing into the signal on the frequency base includes Modified Discrete Cosine Transform processing.

3. An information encoding method as set forth in claim 1, the method including:
detecting an attack portion where amplitude suddenly changes of the input waveform signal,
wherein control of the gain is carried out only with respect to a portion of the input waveform signal corresponding to the attack portion.

4. An information encoding method as set forth in claim 3, wherein control of the gain is carried out only with respect to a portion of the input waveform signal in which amplitude suddenly becomes great.

5. An information encoding method as set forth in claim 1, wherein the gain control function includes coefficients which can be selected in dependency upon the characteristic of the input waveform signal.

6. An information encoding method as set forth in claim 1, wherein the gain control function has a smooth transient portion.

7. An information encoding method as set forth in claim 3, wherein the control information includes position information indicating position of the attack portion by number of sub blocks obtained by subdividing the block.

8. An information encoding method as set forth in claim 1, wherein the control information includes information shared between the adjacent blocks.

9. An information encoding apparatus adapted for encoding an input waveform signal, the apparatus comprising:
means for determining, on the basis of a gain control function of a block forward in point of time at an overlapping portion of a current block and the forward block, a gain control function of at least the overlapping portion of the current block;

gain control means for controlling gain of a signal portion of the input waveform signal corresponding to the current block by using at least the determined gain control function of the overlapping portion, transform means for extracting the gain controlled signal portion so that a portion of samples of the adjacent block has the overlapping portion on the time base to transform it into a signal on the frequency base; and encoding means for encoding the transformed signal and control information for the gain control.

10. An information encoding apparatus as set forth in claim 9, wherein the transform means carries out Modified Discrete Cosine Transform processing.

11. An information encoding apparatus as set forth in claim 9,
the apparatus further including:
detecting means for detecting an attack portion in which amplitude suddenly changes of the input waveform signal,
wherein the gain control means carries out the gain control only with respect to a portion of the input waveform signal corresponding to the attack portion detected by the detecting means.

12. An information encoding apparatus as set forth in claim 11,
wherein the gain control means carries out the gain control only with respect to the input waveform signal of which amplitude suddenly becomes great.

13. An information encoding apparatus as set forth in claim 11,
wherein the control information includes position information indicating position of the attack portion by number of sub blocks obtained by subdividing the block.

14. An information encoding apparatus as set forth in claim 9,
wherein the gain control function includes coefficients which can be selected in dependency upon the characteristic of the input waveform signal.

15. An information encoding apparatus as set forth in claim 9,
wherein the gain control function has a smooth transient portion.

16. An information encoding apparatus as set forth in claim 9,
wherein the control information includes information shared between the adjacent blocks.

17. An information decoding method for decoding a waveform signal from an encoded signal,
the method comprising the steps of:
decoding the encoded signal to take out therefrom a transformed signal and control information;
carrying out inverse transform processing for allowing waveform elements to interfere with each other between adjacent blocks with respect to the transformed signal;
determining, on the basis of the control information and a gain control function of a block forward in point of time at an overlapping portion of a current block and the forward block, a gain control function of at least the overlapping portion of the current block; and
controlling gain of a portion of the signal to which inverse-transform processing has been implemented corresponding to the current block by using at least the determined gain control function of the overlapping portion to restore an original waveform signal.

18. An information decoding method as set forth in claim 17,
wherein the inverse transform processing includes Inverse Modified Discrete Cosine Transform processing.

19. An information decoding method as set forth in claim 17,
wherein the control information includes information indicating an attack portion in which amplitude suddenly changes of the waveform signal,
the gain control being carried out only with respect to the portion corresponding to the attack portion of the signal to which the inverse transform processing has been implemented.

20. An information decoding method as set forth in claim 19,
wherein control of the gain is carried out only with respect to a portion of the signal to which the inverse transform processing has been implemented, in which amplitude suddenly becomes great.

21. An information decoding method as set forth in claim 19,
wherein the control information includes position information indicating position of the attack portion by number of sub blocks obtained by subdividing the block.

22. An information decoding method as set forth in claim 17,
wherein the control information includes information indicating gain quantity,
the gain control function being determined on the basis of the gain quantity.

23. An information decoding method as set forth in claim 17,
wherein the gain control function has a smooth transient portion.

24. An information decoding method as set forth in claim 17,
wherein the control information includes information shared between the adjacent blocks.

25. An information decoding apparatus adapted for decoding a waveform signal from an encoded signal,
the apparatus comprising:
means for decoding the encoded signal to take out therefrom a transformed signal and control information;
inverse-transform means for carrying out inverse-transform processing to allow waveform elements to interfere with each other between adjacent blocks with respect to the transformed signal;
means for determining, on the basis of a gain control function of a block forward in point of time at an overlapping portion of a current block and the forward block, a gain control function of at least the overlapping portion of the current block; and
gain control means for controlling gain of a portion of the signal to which inverse-transform processing has been implemented corresponding to the current block by using at least the determined gain control function of the overlapping portion.

26. An information decoding apparatus as set forth in claim 25,
wherein the inverse transform means carries out Inverse Modified Discrete Cosine Transform processing.

27. An information decoding apparatus as set forth in claim 26,
wherein the control information includes information indicating an attack portion where amplitude suddenly changes of the waveform signal,
the gain control means being operative to carry out the gain control only with respect to the portion corresponding to the attack portion of the signal to which the inverse transform processing has been implemented.

28. An information decoding apparatus as set forth in claim 27,
wherein the gain control means carries out the gain control only with respect to the signal to which the inverse-transform processing has been implemented, in which amplitude suddenly becomes great.

29. An information decoding apparatus as set forth in claim 27,
  wherein the control information includes position information indicating position of the attack portion by number of sub blocks obtained by subdividing the block.

30. An information decoding apparatus as set forth in claim 25,
  wherein the control information includes information indicating gain quantity,
  the gain control function being determined on the basis of the gain quantity.

31. An information decoding apparatus as set forth in claim 25,
  wherein the gain control function has a smooth transient portion.

32. An information decoding apparatus as set forth in claim 25,
  wherein the control information includes information shared between the adjacent blocks.

33. An information recording medium where encoded information are recorded,
  wherein spectrum signals and control information are recorded therein,
  the spectrum signal being generated by:
    determining, on the basis of a gain control function of a block forward in point of time at an overlapping portion of a current block and the forward block, a gain control function of at least the overlapping portion of the current block,
    controlling gain of a portion of an input waveform signal corresponding to the current block by using at least the determined gain control function of the overlapping portion, and
    extracting the gain-controlled signal portion so that a portion of samples of the adjacent blocks has the overlapping portion on the time base,
    the control information including information for the gain control.

34. An information recording medium as set forth in claim 33,
  wherein the transform processing into the signal on the frequency base includes Modified Discrete Cosine Transform processing.

35. An information recording medium as set forth in claim 33,
  wherein control of the gain is carried out only with respect to a portion of the input waveform signal corresponding to an attack portion where amplitude suddenly changes of the input waveform signal.

36. An information recording medium as set forth in claim 35,
  wherein control of the gain is carried out only with respect to a portion of the input waveform signal in which amplitude suddenly becomes great.

37. An information recording medium as set forth in claim 35,
  wherein the control information includes position information indicating position of the attack portion by number of sub blocks obtained by subdividing the block.

38. An information recording medium as set forth in claim 33,
  wherein the gain control function includes coefficients which can be selected in dependency upon the characteristic of the input waveform signal, the control information including information indicating the coefficients.

39. An information recording medium as set forth in claim 33,
  wherein the gain control function has a smooth transient portion.

40. An information recording medium as set forth in claim 33,
  wherein the control information includes information shared between the adjacent blocks.

41. An information transmission method for carrying out transmission of encoded information,
  the method comprising the steps of:
    carrying out, in block units, transmission of a spectrum signal generated by determining, on the basis of a gain control function of a block forward in point of time at an overlapping portion of a current block and the forward block, a gain control function of at least the overlapping portion of the current block to control gain of a portion of an input waveform signal corresponding to the current block by using at least the determined gain control function of the overlapping portion to extract the gain controlled signal portion so that a portion of samples of the adjacent block has the overlapping portion on the time base to transform it into a signal on the frequency base; and
    carrying out, in block units, transmission of control information for the gain control.

42. An information transmission method as set forth in claim 41,
  wherein the control information includes position information indicating position of an attack portion where amplitude suddenly changes of the input waveform signal by number of sub blocks obtained by subdividing the block.

43. An information transmission method as set forth in claim 41,
  wherein the control information includes information shared between the adjacent blocks.

44. An information transmission method as set forth in claim 41,
  wherein the control information includes information indicating gain quantity in the gain control.

45. An information encoding method for encoding an input waveform signal,
  the method comprising the steps of:
    detecting an attack portion in which amplitude suddenly changes of an input waveform signal;
    selectively determining a gain control function in dependency upon the characteristic of the attack portion;
    controlling gain of the attack portion of the input waveform signal on the basis of the determined gain control function;
    transforming the gain-controlled input waveform signal on the time base into a signal on the frequency base; and
    encoding the transformed signal and control information for the gain control.

46. An information encoding method as set forth in claim 45,
  wherein the gain control function has a smooth transient portion.

47. An information encoding method as set forth in claim 45,
  wherein the gain control function includes coefficients which can be selected in dependency upon the characteristic of the input waveform signal, the control information including information indicating the coefficients and position information indicating position of the attack portion.

48. An information encoding apparatus adapted for encoding an input waveform signal,
- means for detecting an attack portion where amplitude suddenly becomes great of the input waveform signal;
- means for selectively determining a gain control function in accordance with the characteristic of the attack portion;
- means for controlling gain of the attack portion of the input waveform signal on the basis of the determined gain control function;
- means for transforming the gain-controlled input waveform signal on the time base into a signal on the frequency base; and
- means for encoding the transformed signal and control information for the gain control.

49. An information encoding apparatus as set forth in claim 48,
wherein the gain control function has a smooth transient portion.

50. An information encoding apparatus as set forth in claim 48,
wherein the gain control function includes coefficients which can be selected in accordance with the characteristic of the input waveform signal,
the control information including information indicating the coefficients and position information indicating position of the attack portion.

51. An information decoding method for decoding a waveform signal from an encoded signal,
the method comprising the steps of:
- decoding the encoded signal to take out therefrom a transformed signal and control information;
- inverse-transforming the transformed signal from a signal on the frequency base to a signal on the time base;
- selectively determining a gain control function on the basis of the control information; and
- controlling gain of the signal to which the inverse transform processing has been implemented corresponding to a portion of the attack portion where amplitude suddenly becomes great by using at least the determined gain control function to restore an original waveform function.

52. An information decoding method as set forth in claim 51,
wherein the gain control function has a smooth transient portion.

53. An information decoding method as set forth in claim 51,
wherein the gain control function includes coefficients which can be selected in accordance with the characteristic of the input waveform signal,
the control information including information indicating the coefficients and position information indicating position of the attack portion.

54. An information decoding apparatus adapted for decoding a waveform signal from an encoded signal,
the apparatus comprising:
- means for decoding the encoded signal to take out therefrom a transformed signal and control information;
- means for inverse-transforming the transformed signal from a signal on the frequency base to a signal on the time base;
- means for selectively determining a gain control function on the basis of the control information; and
- means for controlling gain of a portion of the signal to which the inverse transform processing has been implemented corresponding to an attack portion where amplitude suddenly becomes great by using at least the determined gain control function.

55. An information decoding apparatus as set forth in claim 54,
wherein the gain control function has a smooth transient portion.

56. An information decoding apparatus as set forth in claim 54,
wherein the gain control function includes coefficients which can be selected in accordance with the characteristic of the input waveform signal,
the control information including information indicating the coefficients and position information indicating position of the attack portion.

57. An information recording medium where encoded information are recorded,
wherein spectrum signals and control information are recorded onto or into the information recording medium,
the spectrum signal being prepared by;
- detecting an attack portion in which amplitude suddenly becomes great of an input waveform signal,
- selectively determining a gain control function in accordance with the characteristic of the attack portion;
- controlling gain of the attack portion of the input waveform signal on the basis of the determined gain control function, and
- transforming the gain-controlled input waveform signal on the time base into a signal on the frequency base,
the control information including control information for the gain control.

58. An information recording medium as set forth in claim 57,
wherein the gain control function has a smooth transient portion.

59. An information recording medium as set forth in claim 57,
wherein the gain control function includes coefficients which can be selected in accordance with the characteristic of the input waveform signal,
the control information including information indicating the coefficients and position information indicating position of the attack portion.

60. An information transmission method for carrying out transmission of encoded information,
the method comprising the steps of:
- carrying out, in block units, transmission of a spectrum signal generated by detecting an attack portion where amplitude suddenly becomes great of an input waveform signal to selectively determine a gain control function in accordance with the characteristic of the attack portion to control gain of the attack portion of the input waveform signal on the basis of the determined gain control function to transform the gain-controlled input waveform signal on the time base into a signal on the frequency base; and
- carrying out, in the block units, transmission of control information for the gain control.

61. An information transmission method as set forth in claim 60, wherein the gain control function includes coefficients which can be selected in accordance with the characteristic of the input waveform signal, the control information including information indicating the coefficients and position information indicating position of the attack portion.

62. An information encoding method for encoding an input waveform signal, the method comprising the steps of:

determining, on the basis of a gain control function of a block forward in point of time at an overlapping portion of a current block and the forward block, a gain control function of at least the overlapping portion of the current block;

controlling gain of a signal portion of the input waveform signal corresponding to the current block by using at least the determined gain control function of the overlapping portion;

extracting the gain-controlled signal portion so that a portion of sample of the adjacent block has the overlapping portion on the time base to transform it into a signal on the frequency base; and encoding the transformed signal and control information for the gain control, wherein the control information includes flag information indicating whether or not the gain control is carried out every block, and the control information corresponding to a block or blocks in which the gain control is not carried out consisting of only the flag information.

63. An information encoding apparatus adapted for encoding an input waveform signal, the apparatus comprising:

means for determining, on the basis of a gain control function of a block forward in point of time at an overlapping portion of a current block and the forward block, a gain control function of at least the overlapping portion of the current block;

gain control means for controlling gain of a signal portion of the input waveform signal corresponding to the current block by using at least the determined gain control function of the overlapping portion, transform means for extracting the gain controlled signal portion so that a portion of samples of the adjacent block has the overlapping portion on the time base to transform it into a signal on the frequency base; and encoding means for encoding the transformed signal and control information for the gain control, wherein the control information includes flag information indicating whether or not the gain control is carried out every block, and the control information corresponding to a block or blocks in which the gain control is not carried out consisting of only the flag information.

64. An information decoding method for decoding a waveform signal from an encoded signal, the method comprising the steps of:

decoding the encoded signal to take out therefrom a transformed signal and control information;

carrying out inverse transform processing for allowing waveform elements to interfere with each other between adjacent blocks with respect to the transformed signal;

determining, on the basis of the control information and a gain control function of a block forward in point of time at an overlapping portion of a current block and the forward block, a gain control function of at least the overlapping portion of the current block; and controlling gain of a portion of the signal to which inverse-transform processing has been implemented corresponding to the current block by using at least the determined gain control function of the overlapping portion to restore an original waveform signal, wherein the control information includes flag information indicating whether or not the gain control is carried out every block, and the control information corresponding to a block or blocks in which the gain control is not carried out consisting of only the flag information.

65. An information decoding apparatus adapted for decoding a waveform signal from an encoded signal, the apparatus comprising:

means for decoding the encoded signal to take out therefrom a transformed signal and control information;

inverse-transform means for carrying out inverse-transform processing to allow waveform elements to interfere with each other between adjacent blocks with respect to the transformed signal;

means for determining, on the basis of a gain control function of a block forward in point of time at an overlapping portion of a current block and the forward block, a gain control function of at least the overlapping portion of the current block; and gain control means for controlling gain of a portion of the signal to which inverse-transform processing has been implemented corresponding to the current block by using at least the determined gain control function of the overlapping portion, wherein the control information includes flag information indicating whether or not the gain control is carried out every block, and the control information corresponding to a block or blocks in which the gain control is not carried out consisting of only the flag information.

66. An information recording medium where encoded information are recorded, wherein spectrum signals and control information are recorded therein, the spectrum signal being generated by:

determining, on the basis of a gain control function of a block forward in point of time at an overlapping portion of a current block and the forward block, a gain control function of at least the overlapping portion of the current block, controlling gain of a portion of an input waveform signal corresponding to the current block by using at least the determined gain control function of the overlapping portion, and extracting the gain-controlled signal portion so that a portion of samples of the adjacent blocks has the overlapping portion on the time base, the control information including information for the gain control, wherein the control information includes flag information indicating whether or not the gain control is carried out every block, and the control information corresponding to a block or blocks in which the gain control is not carried out consisting of only the flag information.

67. An information transmission method for carrying out transmission of encoded information, the method comprising the steps of:

carrying out, in block units, transmission of a spectrum signal generated by determining, on the basis of a gain control function of a block forward in point of time at an overlapping portion of a current block and the forward block, a gain control function of at least the overlapping portion of the current block to control gain of a portion of an input waveform signal corresponding to the current block by using at least the determined gain control function of the overlapping portion to extract the gain controlled signal portion so that a portion of samples of the adjacent block has the overlapping portion on the time base to transform it into a signal on the frequency base; and carrying out, in block units, transmission of control information for the gain control, wherein the control information includes flag information indicating whether or not the gain control is carried out every block, and the control information corresponding to a block or blocks in which the gain control is not carried out consisting of only the flag information.

68. An information encoding method for encoding an input waveform signal, the method comprising the steps of:

detecting an attack portion in which amplitude suddenly changes of an input waveform signal;

selectively determining a gain control function in dependency upon the characteristic of the attack portion;

controlling gain of the attack portion of the input waveform signal on the basis of the determined gain control function;

transforming the gain-controlled input waveform signal on the time base into a signal on the frequency base; and encoding the transformed signal and control information for the gain control, wherein the gain control function includes coefficients which can be selected in dependency upon the characteristic of the input waveform signal, the control information including information indicating the coefficients and position information indicating position of the attack portion, wherein the control information includes flag information indicating whether or not the gain control is carried out every predetermined block, and the control information corresponding to a block or blocks in which the gain control is not carried out consisting of only the flag information.

69. An information encoding apparatus adapted for encoding an input waveform signal, means for detecting an attack portion where amplitude suddenly becomes great of the input waveform signal;

means for selectively determining a gain control function in accordance with the characteristic of the attack portion;

means for controlling gain of the attack portion of the input waveform signal on the basis of the determined gain control function;

means for transforming the gain-controlled input waveform signal on the time base into a signal on the frequency base; and means for encoding the transformed signal and control information for the gain control, wherein the gain control function includes coefficients which can be selected in accordance with the characteristic of the input waveform signal, the control information including information indicating the coefficients and position information indicating position of the attack portion, wherein the control information includes flag information indicating whether or not the gain control is carried out every predetermined block, and the control information corresponding to a block or blocks in which the gain control is not carried out consisting of only the flag information.

70. An information decoding method for decoding a waveform signal from an encoded signal, the method comprising the steps of:

decoding the encoded signal to take out therefrom a transformed signal and control information;

inverse-transforming the transformed signal from a signal on the frequency base to a signal on the time base;

selectively determining a gain control function on the basis of the control information; and controlling gain of the signal to which the inverse transform processing has been implemented corresponding to a portion of the attack portion where amplitude suddenly becomes great by using at least the determined gain control function to restore an original waveform function, wherein the gain control function includes coefficients which can be selected in accordance with the characteristic of the input waveform signal, the control information including information indicating the coefficients and position information indicating position of the attack portion, wherein the control information includes flag information indicating whether or not the gain control is carried out every predetermined block, and the control information corresponding to a block or blocks in which the gain control is not carried out consisting of only the flag information.

71. An information decoding apparatus adapted for decoding a waveform signal from an encoded signal, the apparatus comprising:

means for decoding the encoded signal to take out therefrom a transformed signal and control information;

means for inverse-transforming the transformed signal from a signal on the frequency base to a signal on the time base;

means for selectively determining a gain control function on the basis of the control information; and means for controlling gain of a portion of the signal to which the inverse transform processing has been implemented corresponding to an attack portion where amplitude suddenly becomes great by using at least the determined gain control function, wherein the gain control function includes coefficients which can be selected in accordance with the characteristic of the input waveform signal, the control information including information indicating the coefficients and position information indicating position of the attack portion, wherein the control information includes flag information indicating whether or not the gain control is carried out every predetermined block, and the control information corresponding to a block or blocks in which the gain control is not carried out consisting of only the flag information.

72. An information recording medium where encoded information are recorded, wherein spectrum signals and control information are recorded onto or into the information recording medium, the spectrum signal being prepared by;

detecting an attack portion in which amplitude suddenly becomes great of an input waveform signal, selectively determining a gain control function in accordance with the characteristic of the attack portion;

controlling gain of the attack portion of the input waveform signal on the basis of the determined gain control function, and transforming the gain-controlled input waveform signal on the time base into a signal on the frequency base, the control information including control information for the gain control, wherein the gain control function includes coefficients which can be selected in accordance with the characteristic of the input waveform signal, the control information including information indicating the coefficients and position information indicating position of the attack portion, wherein the control information includes flag information indicating whether or not the gain control is carried out every predetermined block, and the control information corresponding to a block or blocks in which the gain control is not carried out consisting of only the flag information.

73. An information transmission method for carrying out transmission of encoded information, the method comprising the steps of:

carrying out, in block units, transmission of a spectrum signal generated by detecting an attack portion where amplitude suddenly becomes great of an input waveform signal to selectively determine a gain control function in accordance with the characteristic of the attack portion to control gain of the attack portion of the input waveform signal on the basis of the determined gain control function to transform the gain-controlled input waveform signal on the time base into a signal on the frequency base; and carrying out, in the block units, transmission of control information for the gain control, wherein the gain control function includes coefficients which can be selected in accordance with the characteristic of the input waveform signal, the control information including information indicating the coefficients and position information indicating position of the attack portion, wherein the control information includes flag information indicating whether or not the gain control is carried out every predetermined block, and the control information corresponding to a block or blocks in which the gain control is not carried out consisting of only the flag information.

* * * * *